(12) United States Patent
Acosta et al.

(10) Patent No.: US 7,374,092 B2
(45) Date of Patent: *May 20, 2008

(54) COMBINED DATA READER AND ELECTRONIC ARTICLE SURVEILLANCE (EAS) SYSTEM

(75) Inventors: Jorge L. Acosta, Eugene, OR (US);
Michael P. Svetal, Eugene, OR (US);
Mohamed A. Salim, Eugene, OR (US);
Robert W. Rudeen, Eugene, OR (US);
Craig H. Bontly, Eugene, OR (US)

(73) Assignees: Datalogic Scanning, Inc., Eugene, OR (US); Sensormatic Electronics Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/482,536

(22) Filed: Jul. 7, 2006

(65) Prior Publication Data
US 2007/0063045 A1 Mar. 22, 2007

Related U.S. Application Data

(63) Continuation of application No. 10/985,761, filed on Nov. 10, 2004, now Pat. No. 7,172,123, which is a continuation of application No. 10/825,444, filed on Apr. 14, 2004, which is a continuation of application No. 10/062,274, filed on Feb. 1, 2002, now Pat. No. 6,783,072.

(51) Int. Cl.
*G06K 7/10* (2006.01)

(52) U.S. Cl. .................. 235/462.01; 235/383

(58) Field of Classification Search .......... 235/462.01, 235/383, 385, 451, 454; 340/572.3
See application file for complete search history.

(56) References Cited

U.S. PATENT DOCUMENTS 4,141,078 A 2/1979 Bridges, Jr. et al. ........ 364/900

(Continued)

FOREIGN PATENT DOCUMENTS

DE 199008880 9/2000

(Continued)

OTHER PUBLICATIONS

Brochure: Mettler Toledo 8217AS Adaptive Scale (1996).

(Continued)

*Primary Examiner*—Thien Minh Le
(74) *Attorney, Agent, or Firm*—Stoel Rives LLP

(57) ABSTRACT

An integrated data reader and electronic article surveillance (EAS) system, and methods of operation. In one configuration, a data reader such as a bar code scanner is equipped with an EAS deactivation module disposed behind the scanner surface preferably downstream and/or upstream of the scanner window. The system may be configured such that the EAS deactivation module is interchangeable from the right side of the scanner housing (which is preferred for left-to-right scanning motion) to the left side of the scanner housing (which is preferred for right-to-left scanning motion). In other configurations, the deactivation module may be disposed in the housing adjacent to the window and oriented longitudinally and parallel to the sweep direction of the item. The EAS deactivation modules have various configurations such as simple planar coils, a magnetically active core with coil windings, or two part L-shape construction.

20 Claims, 13 Drawing Sheets

U.S. PATENT DOCUMENTS

| | | | | |
|---|---|---|---|---|
| 4,575,624 | A | 3/1986 | Klinkhardt | 235/449 |
| 4,652,863 | A | 3/1987 | Hultman | 340/551 |
| 4,745,401 | A | 5/1988 | Montean | 340/572 |
| 4,752,758 | A | 6/1988 | Heltemes | 335/284 |
| 4,960,651 | A | 10/1990 | Pettigrew et al. | 428/607 |
| 4,964,053 | A | 10/1990 | Humble | 705/416 |
| 5,059,951 | A | 10/1991 | Kaltner | 340/572 |
| 5,103,235 | A | 4/1992 | Clemens | 343/742 |
| 5,139,100 | A | 8/1992 | Brauneis | 177/25.15 |
| 5,142,292 | A | 8/1992 | Chang | 343/742 |
| 5,210,524 | A | 5/1993 | Schwarz et al. | 340/551 |
| 5,225,807 | A | 7/1993 | Zhou et al. | 340/551 |
| 5,341,125 | A | 8/1994 | Plonsky et al. | 340/572 |
| 5,376,923 | A | 12/1994 | Kindschy | 340/572 |
| 5,377,269 | A | 12/1994 | Heptig et al. | 380/25 |
| 5,410,108 | A | 4/1995 | Williams et al. | 177/25.15 |
| 5,587,703 | A | 12/1996 | Dumont | 340/572 |
| 5,588,621 | A | 12/1996 | Collins et al. | 248/27.1 |
| 5,635,906 | A | 6/1997 | Joseph | 340/572 |
| 5,747,744 | A | 5/1998 | Kraft et al. | 177/25.15 |
| 5,837,988 | A | 11/1998 | Bobba et al. | 235/467 |
| 5,841,348 | A | 11/1998 | Herzer | 340/551 |
| 5,886,336 | A | 3/1999 | Tang et al. | 235/462.43 |
| 5,917,412 | A | 6/1999 | Martin | 340/572.3 |
| 5,939,984 | A | 8/1999 | Brady et al. | 340/572.1 |
| 5,955,951 | A | 9/1999 | Wischerop et al. | 340/572.8 |
| 5,963,134 | A | 10/1999 | Bowers et al. | 340/572.1 |
| 5,978,772 | A | 11/1999 | Mold | 705/16 |
| 5,990,794 | A | 11/1999 | Alicot et al. | 340/573.1 |
| 6,025,780 | A | 2/2000 | Bowers et al. | 340/572.3 |
| 6,102,290 | A | 8/2000 | Swartz et al. | 235/462.01 |
| 6,114,961 | A | 9/2000 | Denholm et al. | 340/572.3 |
| 6,121,878 | A | 9/2000 | Brady et al. | 340/572.1 |
| 6,154,135 | A | 11/2000 | Kane et al. | 340/572 |
| 6,154,137 | A | 11/2000 | Goff et al. | 340/572.4 |
| 6,169,483 | B1 | 1/2001 | Ghaffari et al. | 340/572.3 |
| 6,206,285 | B1 | 3/2001 | Baitz et al. | 235/380 |
| 6,208,235 | B1 | 3/2001 | Trontelj | 340/10.1 |
| 6,237,852 | B1 | 5/2001 | Svetal et al. | 235/462.43 |
| 6,252,508 | B1 | 6/2001 | Vega et al. | 340/572.1 |
| 6,281,796 | B1 | 8/2001 | Canipe et al. | 340/572.1 |
| 6,299,702 | B1 | 10/2001 | Herzer | 148/108 |
| 6,335,686 | B1 | 1/2002 | Goff et al. | 340/572.4 |
| 6,346,884 | B1 | 2/2002 | Uozumi et al. | 340/572.1 |
| 6,356,197 | B1 | 3/2002 | Patterson et al. | 340/572.1 |
| 6,396,455 | B1 * | 5/2002 | Ely et al. | 343/788 |
| 6,486,780 | B1 | 11/2002 | Garber | 340/572.1 |
| 6,497,361 | B1 | 12/2002 | Mason | 235/383 |
| 6,499,656 | B1 | 12/2002 | Marsh et al. | 235/375 |
| 6,507,279 | B2 | 1/2003 | Loof | 340/572.1 |
| 6,517,000 | B1 | 2/2003 | McAllister et al. | 235/462.01 |
| 6,592,037 | B1 | 7/2003 | Clancy | 235/462.13 |
| 6,595,421 | B2 | 7/2003 | Detwiler | 235/462.14 |
| 6,598,791 | B2 | 7/2003 | Bellis et al. | 235/383 |
| 6,764,010 | B2 | 7/2004 | Collins, Jr. et al. | 235/462.11 |
| 6,783,072 | B2 | 8/2004 | Acosta et al. | 235/462.12 |
| 6,854,647 | B2 | 2/2005 | Collins, Jr. et al. | 235/383 |
| 6,857,567 | B2 | 2/2005 | Latimer | 235/383 |
| 7,132,947 | B2 | 11/2006 | Clifford et al. | 340/572.3 |
| 2002/0123932 | A1 | 9/2002 | Brenhouse | |
| 2003/0075602 | A1 | 4/2003 | Wike, Jr et al. | 235/383 |
| 2003/0135417 | A1 | 7/2003 | Bodin | 705/16 |
| 2003/0209600 | A1 | 11/2003 | Collins, Jr. et al. | 235/383 |
| 2004/0000591 | A1 | 1/2004 | Collins, Jr. et al. | 235/462.14 |
| 2004/0189472 | A1 | 9/2004 | Acosta et al. | 235/462.13 |
| 2005/0099300 | A1 | 5/2005 | Acosta et al. | 235/462.13 |
| 2005/0145694 | A1 | 7/2005 | Collins, Jr. | 235/383 |
| 2005/0219053 | A1 | 10/2005 | Clifford et al. | 340/572.4 |

FOREIGN PATENT DOCUMENTS

| | | |
|---|---|---|
| EP | 0 329 402 B1 | 12/1994 |
| EP | 1 098 276 A2 | 5/2001 |
| EP | 1 335 336 A2 | 8/2003 |
| WO | WO 85/02285 | 5/1985 |
| WO | WO 00/26880 | 5/2000 |
| WO | WO 00/67193 | 11/2000 |

OTHER PUBLICATIONS

Brochure: MagellanSL™ 360-Degree Scanner/Scale, PSC Inc. (Feb. 2000).

Brochure: Sensormatic ScanMax™/SlimPad™ Electronic Article Surveillance Deactivator, Sensormatic Electronics Corporation (Jul. 1999).

Brochure: Sensormatic SlimPad™ Pro Ultra-Max™ Label Deactivator, Sensormatic Electronics Corporation (2002) Downloaded from http://www.sensormatic.com/EAS/deactivation/slimpad.asp, visited Jul. 29, 2003.

Brochure: Sensormatic ScanMax™ HS Pro Ultra-Max® Scanner-Embedded Label Deactivator, Sensormatic Electronics Corporation (2002) http://www.sensormatic.com/EAS/deactivation/slimpad.asp, visited Jul. 29, 2003.

Brochure: Mettler Toledo 8217AS Scanner Scale (2003) from http://www.mt.com/mt/product_detail/product.jsp?m=t &key=Y3MDg4NjM1Mj visited Aug. 28, 2003.

Installation Guide for Sensormatic Acousto-Link™ Option for Ultra-Max Deactivators, Sensormatic Electronics Corporation (2000).

Sensormatic 2001 Product Catalog, pp. 117-119, 139-145, Sensormatic Electronics Corporation (Jun. 2001).

Transponder News, Aug. 14, 2003, http://www.rapidttp.com/transponder/index.html, visited Aug. 20, 2003.

Spectra-Physics VS1000 and VS1200 Scanner Level 1 Sevice Manual, pp. 4-31 through 4-32 (Dec. 1994).

PSC Scanning, Inc. Magellan SL Scanner and Scanner/Scale Installation and Operation Manual, pp. 1-3 through 1-6 and 2-23 through 2-26 (2001).

Photographs of NCR 7880 Scanner-scale; manufacture date listed Sep. 1996.

NCR 7880 Scanner-scale User's Guide © 1997 (note: p. 1-16 "Checkpoint" interface; p. 1-18 "Checkpoint Upgrade"; p. 3-7, 3-8 and 3-16 model designation for Checkpoint and installation instruction).

Brochure: Checkpoint Systems, Inc.; RF-based deactivation systems integrated into scanners and scanner-scales, brochure # TFS-007 © 1998 (two pages).

NCR 7875 Scanner/Scale Checkpoint for Kit 7875-K203-V001 (Document # 497-0407861) indicated release date Jan. 21, 1997; (p. 5, 8, 9).

* cited by examiner

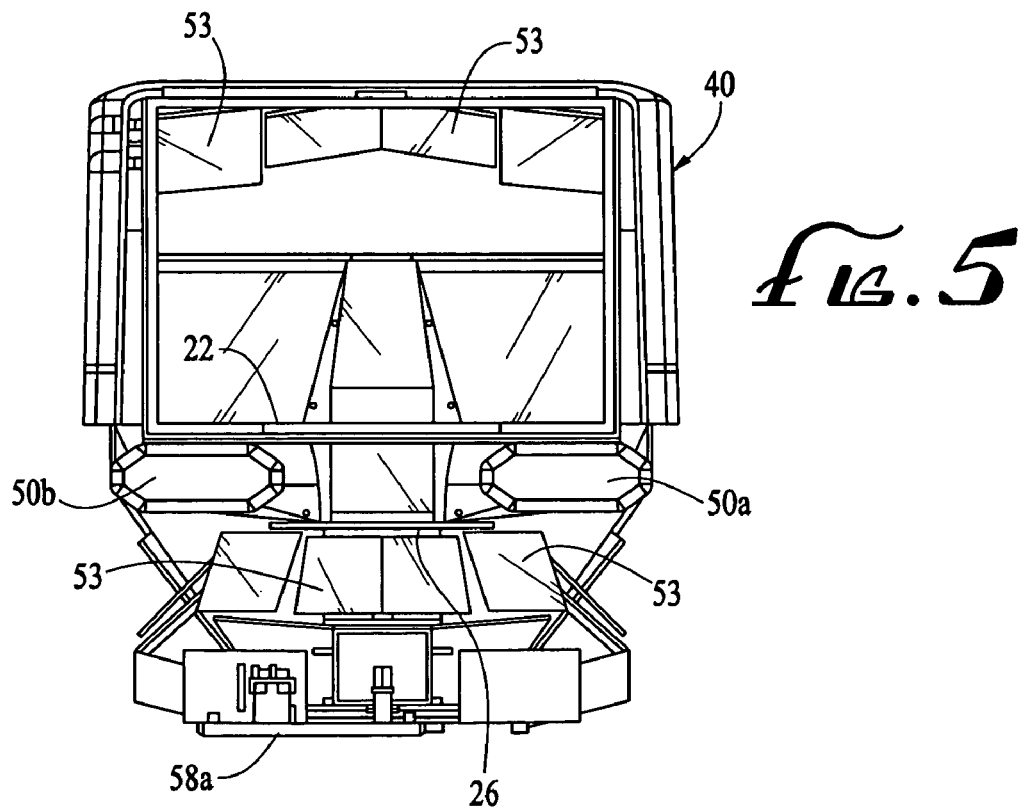
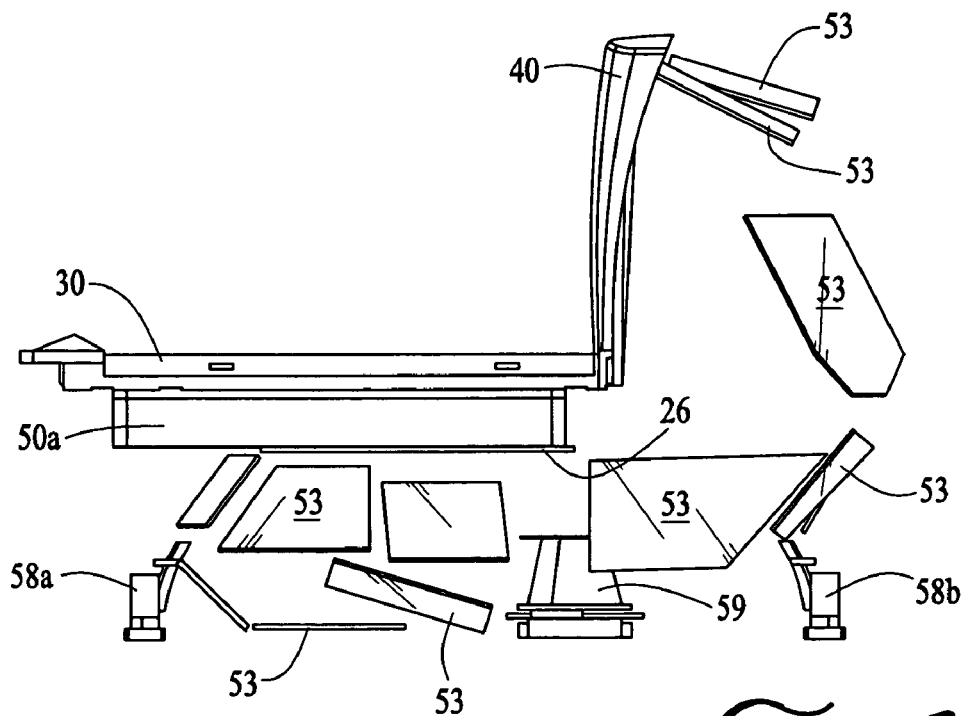

COMBINED DATA READER AND ELECTRONIC ARTICLE SURVEILLANCE (EAS) SYSTEM

RELATED APPLICATION DATA

This application is a continuation of application Ser. No. 10/985,761 filed Nov. 10, 2004, now U.S. Pat. No. 7,172,123 which is a continuation of application Ser. No. 10/825,444 filed Apr. 14, 2004, which is a continuation of application Ser. No. 10/062,274 filed Feb. 1, 2002, U.S. Pat. No. 6,783,072, which applications are hereby incorporated by reference as if fully set forth herein.

BACKGROUND

The field of the present invention relates to data reading systems and electronic article security (EAS) systems. In particular, a method and apparatus are described herein for integrating a data reading system such as a bar code scanner with an EAS system.

In both retail checkout and inventory control environments, items are typically provided with readable tags or labels such as bar codes or RFID tags. Data reading devices such as barcode scanners and RFID readers are provided at the checkout station to read the codes or tags and obtain the data contained therein. The data may be used to identify the article, its price, and other characteristics or information related to checkout or inventory control. These data readers automate the information retrieval to facilitate and speed the checkout process. Thus data readers such as bar code scanners are pervasive at retail checkout.

Scanners generally come in three types: (a) handheld, such as the PowerScan™ scanner, (b) fixed and installed in the countertop such as the Magellan® scanner, or (c) a hybrid scanner such as the Duet® scanner usable in either a handheld or fixed mode. Each of these scanners is manufactured by PSC Inc. of Eugene, Oreg. In a typical operation, retail clerk uses either a handheld scanner to read the barcode symbols on the articles one at a time or passes the articles through the scan field of the fixed scanner one at a time. The clerk then places the articles into a shopping bag or other suitable container.

Though bar codes provide for rapid and accurate item identification at checkout, the bar codes do not provide for item security against theft. Electronic article surveillance (EAS) systems have employed either reusable EAS tags or disposable EAS tags to monitor articles to prevent shoplifting and unauthorized removal of articles from store. Reusable EAS tags are normally removed from the articles before the customer exits the store. Disposable EAS tags are generally attached to the packaging by adhesive or are disposed inside item packaging. These tags remain with the articles and must be deactivated before they are removed from the store by the customer. Deactivation devices use coils which are energized to generate a magnetic field of sufficient magnitude to render the EAS tag inactive. Once deactivated, the tags are no longer responsive to the incident energy of the EAS system so that an alarm is not triggered.

In one type of deactivation system the checkout clerk passes the articles one at a time over a deactivation device to deactivate the tags and then places the articles into a shopping bag or other container. This system employs a deactivation coil (or coils) in a separate housing disposed horizontally within the counter typically downstream of the fixed scanner. The clerk moves the tagged articles through the scan volume scanning the bar code and then subsequently moves the item across the horizontal top surface of the deactivation coil housing such that the tag is disposed generally coplanar with the coil.

Some retail establishments having high volumes find it desirable to expedite and facilitate the checkout process including the scanning of the bar code data and the deactivation of the EAS tags. In the typical point of sale (POS) location such as the checkout counter of a retail checkout station, counter space is limited. In one system, an EAS deactivation coil is disposed around the horizontal scan window of a two-window "L" shaped scanner such as the Magellan® scanners. In such a system, bar code scanning and EAS tag deactivation presumably are accomplished over the same scan volume. However, the present inventors have recognized that such a configuration may not best accommodate the expected motion of items through the checkout station.

SUMMARY

The present invention is directed to an integrated data reader and EAS system, and methods of operation. In a preferred configuration, a data reader such as a bar code scanner is equipped with one or more EAS deactivation modules disposed behind the scanner surface and arranged to generate a deactivation field of a desired orientation to deactivate EAS tags on items as they are passed through the scan field defined by the scanner window(s) of the bar code scanner.

Additional aspects and advantages of this invention will be apparent from the following detailed description of preferred embodiments, which proceeds with reference to the accompanying drawings.

BRIEF DESCRIPTION OF THE DRAWINGS

FIG. 5 is a front plan view of FIG. 4.

FIG. 6 is a left side plan view of FIG. 4.

DETAILED DESCRIPTION OF PREFERRED EMBODIMENTS

Figure 1:
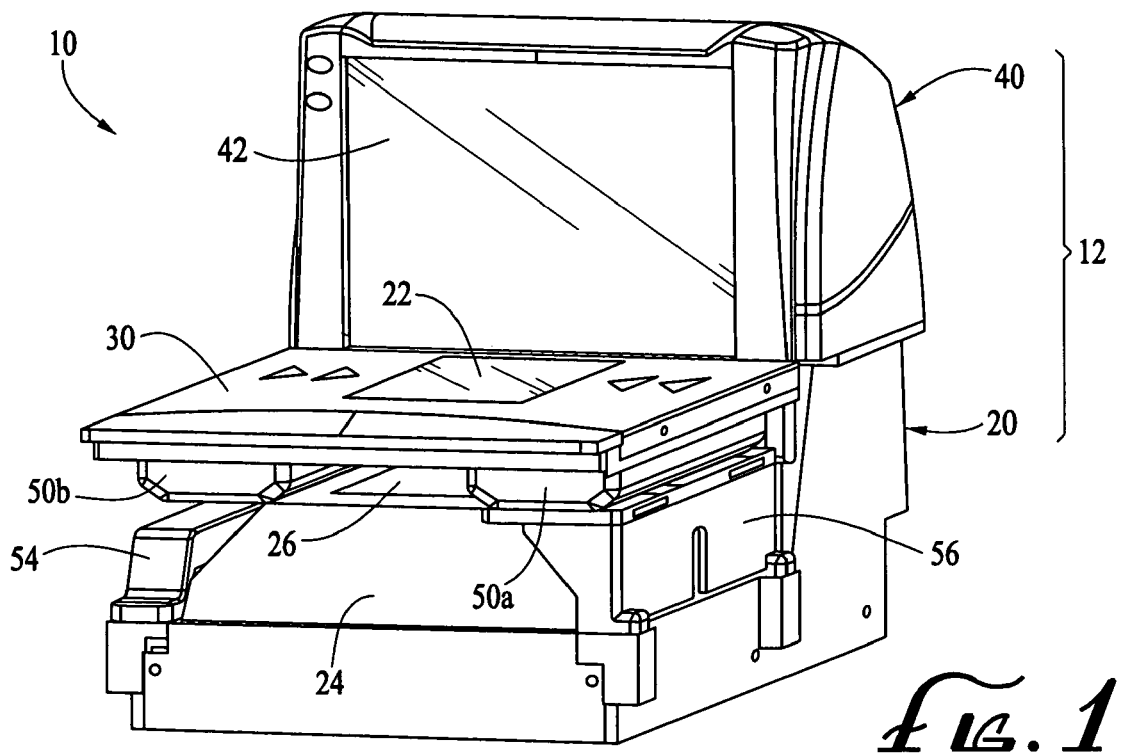
FIG. 1 is a schematic diagram in a front perspective view of a combined data reader and EAS system according to a first embodiment of the present invention.

Preferred embodiments of the present invention will now be described with reference to the drawings. To facilitate description, any reference numeral representing an element in one figure will represent the same element in any other figure.

Figure 2:
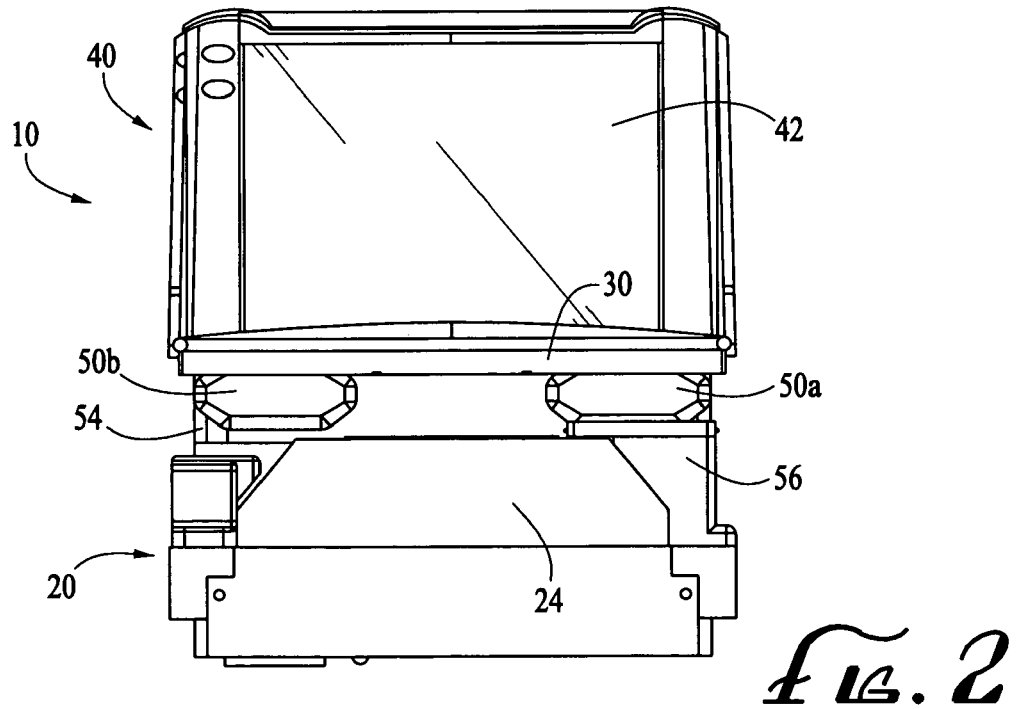
FIG. 2 is a front plan view of FIG. 1.
Figure 3:
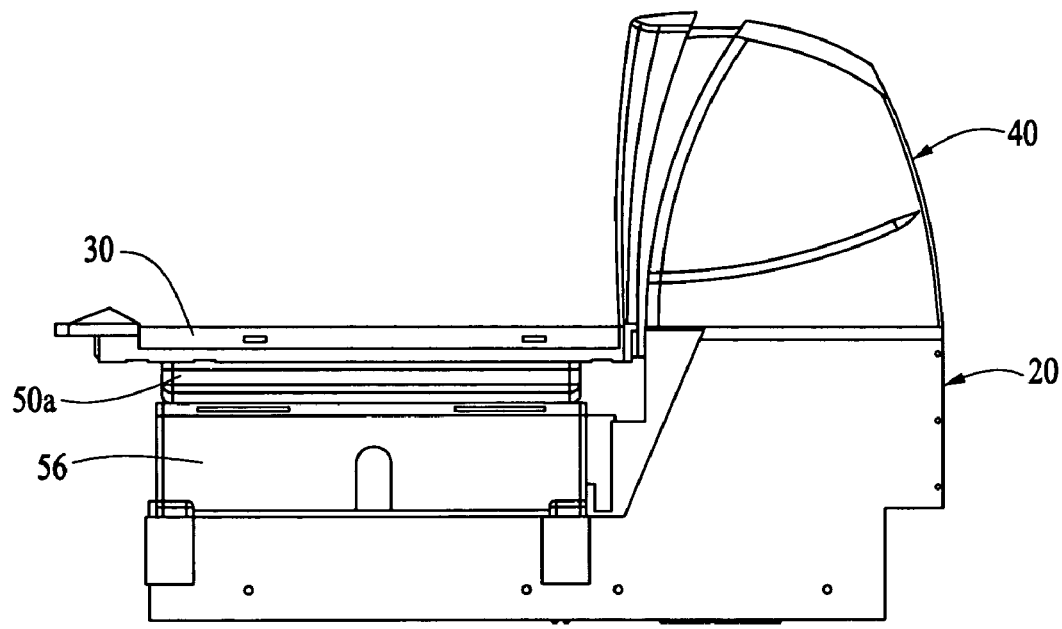
FIG. 3 is a left side plan view of FIG. 1.

FIGS. 1-6 illustrate a combined data reader and EAS system 10 according to a first preferred embodiment. Referring primarily to FIGS. 1-3, the system 10 includes an outer housing 12 with a lower housing section 20 containing a horizontal window 22 and an upper housing section 40 containing a vertical window 42. The lower housing section 20 includes a scale system supporting the weigh platter 30. The weigh platter 30 may comprise a single plane, or may comprise multiple planes as described in U.S. Pat. No. 5,834,708 hereby incorporated by reference when the scanner-scale comprises a two-plane or vertical plane scanner. Though the system 10 is illustrated as a two-plane scanner with horizontal window 22 and vertical window 42, the system may alternately comprise a single window, either horizontal or vertical.

The system 10 includes one or two EAS coil units 50a, 50b each preferably encased in a plastic enclosure. The coil units 50a, 50b are each disposed between the weigh platter 30 and the bottom inner scan housing 24, but laterally outside the horizontal window 22 (that is, to the left or right as from the position of FIGS. 1-2) so as to not interfere with the scan pattern being generated and projected out window 22.

Various components of the system 10, such as the enclosure 40/20 and even the platter 30, may be constructed of any suitable material, but are preferably constructed of a plastic or other suitable material that does not interfere with the magnetic fields produced by the coils.

Figure 4:
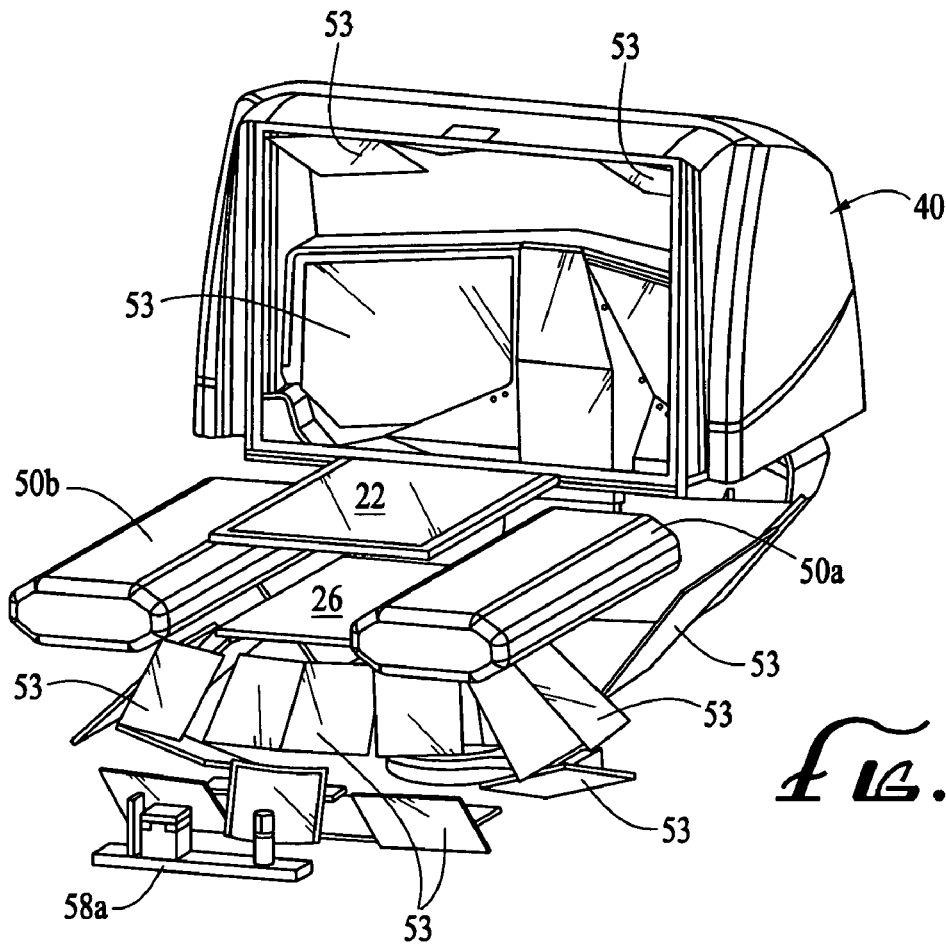
FIG. 4 is a schematic diagram in a front perspective view of the system of FIG. 1 illustrated with the housing and weigh platter removed.
Figure 7:
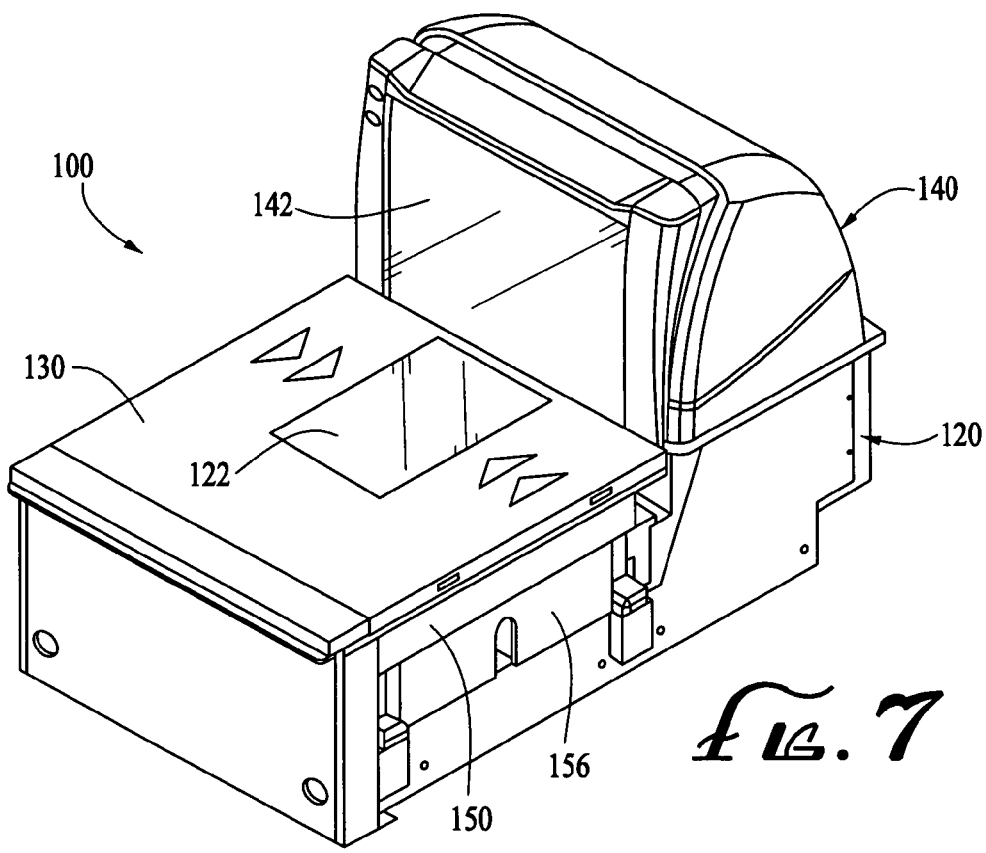
FIG. 7 is a schematic diagram in a front right perspective view of a combined data reader and EAS system according to a second embodiment.
Figure 8:
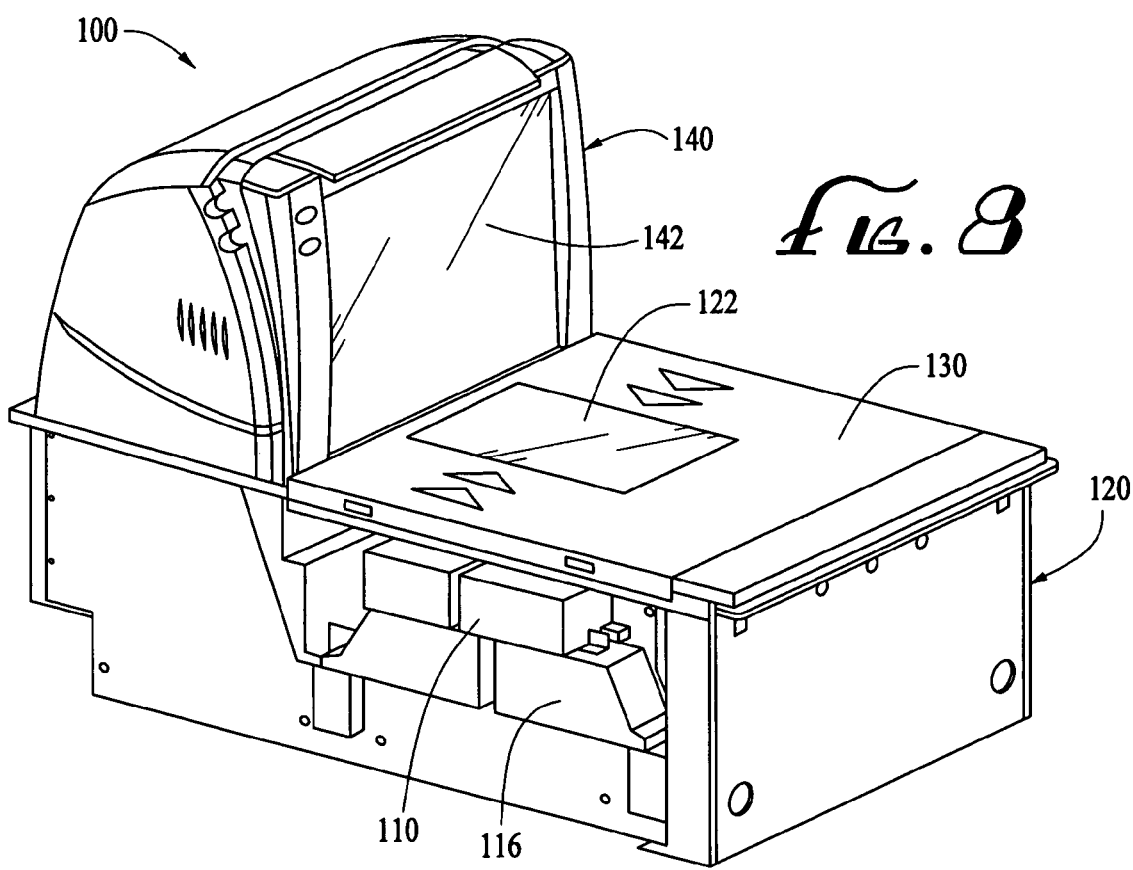
FIG. 8 is a front right left perspective view of the system of FIG. 7.
Figure 9:
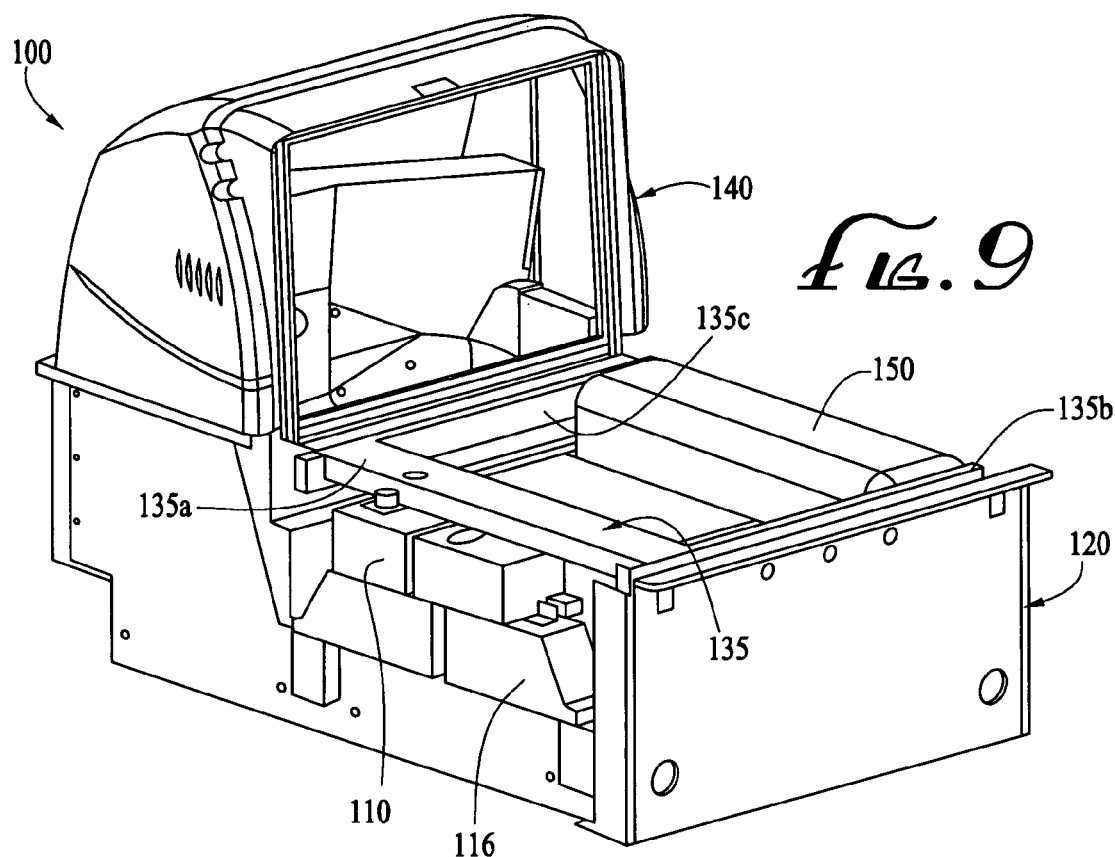
FIG. 9 is a schematic diagram in a front left perspective view of the system of FIG. 7 illustrated with the housing and weigh platter removed.
Figure 10:
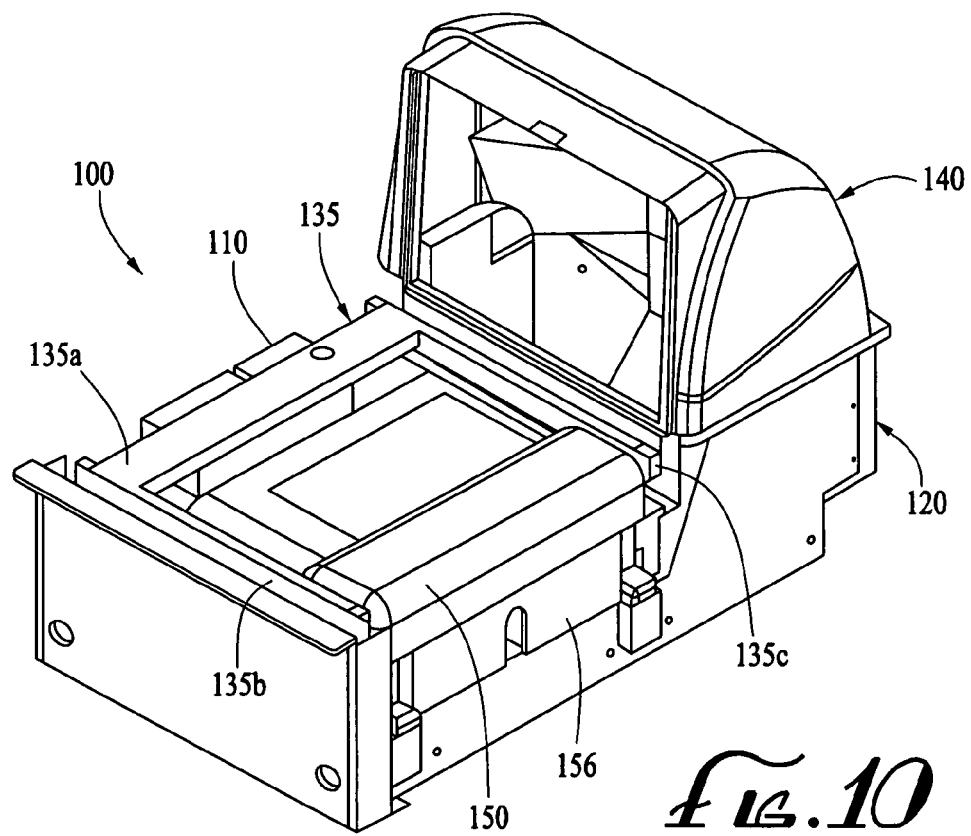
FIG. 10 is a schematic diagram in a front right perspective view of the system of FIG. 7 illustrated with the housing and weigh platter removed.

FIGS. 4-6 illustrate the system 10 with portions of the housing removed to better illustrate the internal components. The system 10 includes a first laser module and collector assembly 58a disposed on one side of the unit producing a first laser beam directed onto one side of the polygon mirror 59 and a second laser beam and collector assembly 58b disposed on the other side of the unit from the first assembly 58a producing a first laser beam directed onto one side of the polygon mirror 59. The first and second reading beams are scanned by the polygon mirror 59 across pattern mirrors 53 in the lower housing section 20, usually reflecting off a first (primary) pattern mirror and then a second (secondary) mirror with some of the scan lines being formed by reflection off a third (tertiary) pattern mirror, and then all the scan lines being directed out through one of the windows 22, 42 projecting a complex scan pattern into the scan volume. Alternately, the only a single laser diode may be required generating a laser beam which is split by a beam splitter into a first and second reading beams, the first reading beam being directed onto the first side of the polygon mirror 59 and the second reading beam being directed onto the second side of the polygon mirror 59.

The system 10 of FIGS. 1-3 is illustrated with two coil units 50a and 50b, but the system may be operative with one coil unit or two coil units. In a first configuration, the system 10 is provided with only one coil unit. Presuming that the scanner 10 is installed in a checkout counter with the flow of goods going from left-to-right (as viewed in FIGS. 1-6), the coil unit 50a is disposed downstream of the scan volume. Items are passed left-to-right over the window 22 and through the scan volume where the scanner reads the optical code. Once the scanner has read the optical code on the item and identified it, in the same motion, the item is passed through the deactivation field of the coil unit 50a which is in communication with the scanner and deactivates the EAS tag on the item. Alternately, the system may be installed in a checkout counter with the flow of goods going from right-to-left (as viewed in FIGS. 1-6), with the coil unit 50b disposed downstream of the scan volume. Items are passed right-to-left over the window 22 and through the scan volume where the scanner reads the optical code. Once the scanner has read the optical code on the item and identified it, in the same motion, the item is passed through the deactivation field of the coil unit 50b which is in communication with the scanner and deactivates the EAS tag on the item. In a single coil unit configuration, the other coil unit may be omitted yielding cost savings. In any of these configurations, the deactivation field and the scan volume may overlap.

In yet another embodiment, the system may comprise two coil units 50a, 50b. The coil units 50a and 50b comprise different functions. For example, presuming that the scanner 10 is installed in a checkout counter with the flow of goods going from right-to-left (as viewed in FIGS. 1-6), the coil unit 50a is disposed upstream of the scan volume and the coil unit 50b is disposed downstream of the scan volume. Items are passed right-to-left over the window 22 and through the scan volume where the scanner reads the optical code. The downstream coil 50b may be configured and operable for deactivating an EAS tag and the upstream coil unit 50a may be configured and operable to sense an EAS tag. In operation, the upstream coil 50a senses the presence of an EAS tag even before the item is scanned thus alerting the system 10 that the item being scanned has an EAS tag. Once the scanner has read the optical code on the item and identified it, in the same motion, the item is passed through the deactivation field of the downstream coil unit 50b, which has been alerted by the upstream of the presence of the EAS tag, and which deactivates the EAS tag.

The coil unit 50a may be physically and electrically integrated into the scanner to a range of varying degrees. The unit is disposed laterally in a cavity between the weigh platter and the lower enclosure 24. The unit 50a is also disposed laterally of the lower window 26 to avoid interfering with the scan beam projected off the lower mirror array and through the lower window 26. The coil unit 50a is mounted on a mounting bracket or coil mount 56. The coil mount 56 is mounted onto a side of the lower enclosure 24.

The above-described construction is just one example for mounting and positioning the coil units 50a, 50b. In one alternative, the coil units 50a, 50b may be integrated into the lower enclosure 24 or mounted directly thereto. In another alternative, the coil units 50a, 50b may be mounted to or even integrated or otherwise incorporated into the platter 30.

Since the scanner may be installed in a checkout counter in either a left-to-right or right-to-left configuration, the coil unit 50a is preferably constructed to be interchangeable and usable in the position of the unit 50b. FIGS. 7-12 illustrate an alternate embodiment for a system 100 in which the deactivator coil units are interchangeable.

The system 100 comprises a two plane scanner in the same configuration as the previous embodiment with a vertical window 142 disposed in the upper housing section 140 and a horizontal window 122 disposed in the weigh platter 130 of the lower housing section 120. The EAS coil unit 150 is disposed beneath the weigh platter 130 mounted via the coil mount 156. Alternately, the system 100 may comprise a vertical scanner window 142 only (the lower window 122 omitted) the lower housing section 120 being configured with or without the weigh platter and scale. In yet another alternative, the unit may comprise a horizontal scanner, with the horizontal window 122 only, the upper housing section 140 being omitted.

Returning to describing the illustrated configuration illustrated, the weigh platter 130 is supported by a spider 135 which is operably connected to the load cell 110. The load cell is mounted onto a mounting block 116 to the lower enclosure 124.

The coil unit 150 is illustrated in FIGS. 7-10 on the right side of the weigh platter 130, preferable for a left-to-right scanning. The spider 135 has a U-shaped construction, with the central portion 135a disposed over the load cell 110, and a first lateral extension 135b disposed at the front of the weigh platter 130 and second lateral extension disposed at the rear of the weigh platter 130.

Figure 11:
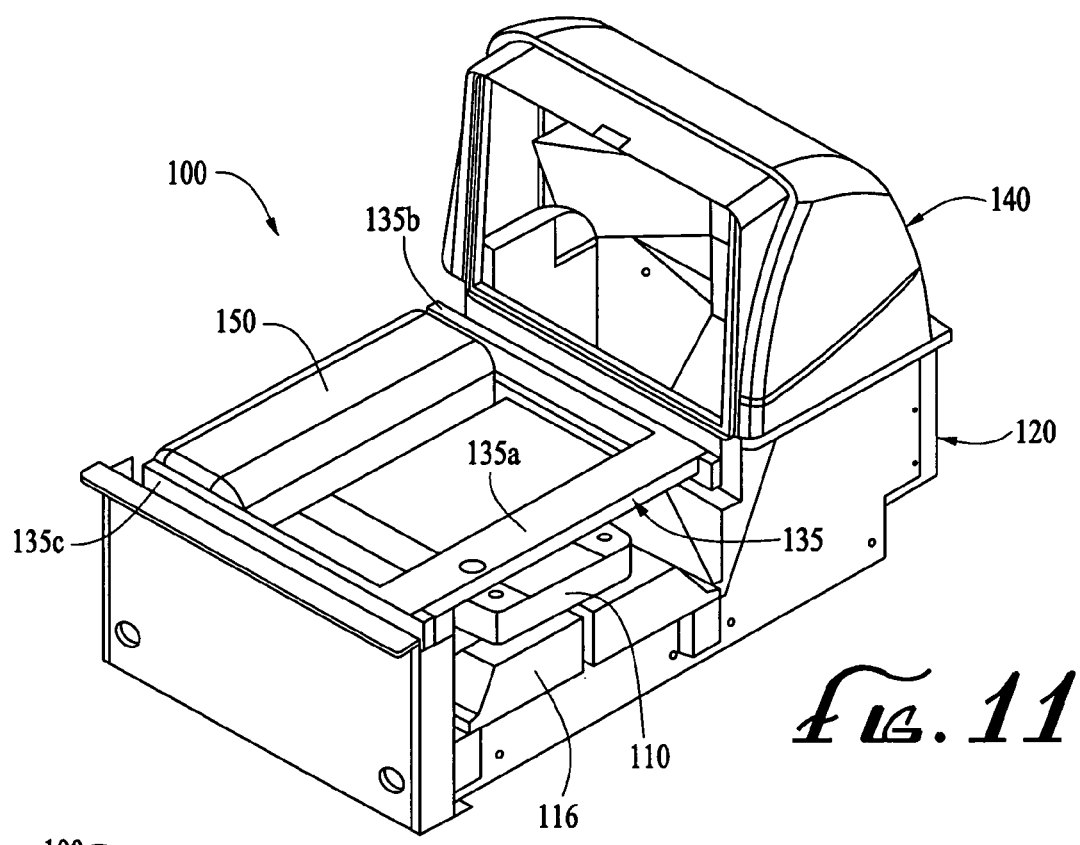
FIG. 11 is a schematic diagram in a front right perspective view of the system of FIGS. 7-10, with the EAS coil unit inverted to the left side of the system.
Figure 12:
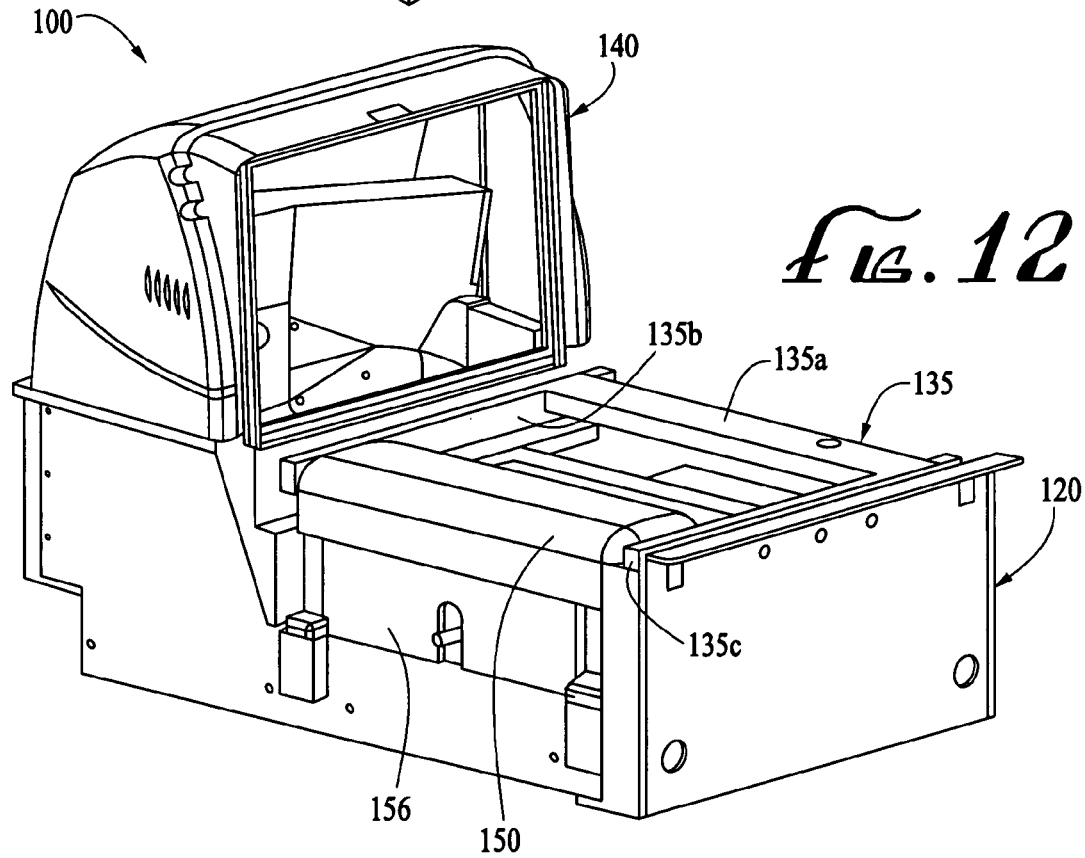
FIG. 12 is a front left perspective view of the system of FIG. 11.

The system 100 is readily convertible to a right-to-left configuration. FIGS. 11-12 illustrate the system 100 of FIGS. 7-10 reconfigured for a right-to-left scanning configuration. In FIGS. 11-12 the coil unit 150 and mount bracket 156 have been moved to the left side of the housing. The spider 135 has also been rotated with the central portion 135a shifted to the right side of the housing, with the load cell 110 and mount 116 also to the right side of the housing. The lateral extensions 135b and 135c of the spider 135 maintain a support position below the weigh platter 130 and on opposite sides of the coil unit 150.

It is anticipated that the unit 100 may preferably be configured upon ordering at the manufacturer, and then assembled in the selected configuration (left-to-right or right-to-left) as ordered. By having the components being interchangeable, only a single configuration for each of (1) coil unit 150, (2) coil mount 156, (3) spider 135, (4) load cell 110, and (5) bracket 116. The coil unit 150 is connected by a suitable connector, such as an electrical cable, to electronics in the unit 100 such as a printed circuit board disposed in the lower housing section 120. Alternately the unit may be configured in the filed.

In order to convert from left-to-right configuration to right-to-left configuration, the weigh platter 130 is removed to gain access to the other components, and then the coil unit 150, coil mount 156, spider 135, load cell 110, and bracket 116 are removed. The bracket 116 is then reinstalled onto the right side and the load cell 110 is mounted to the bracket 116. The spider 135 is rotated 180° and secured to the load cell 110. Finally the coil mount 156 is installed on the left side and the coil unit 150 reinstalled onto the coil mount. The electrical connections to the load cell 110 and coil unit 150 are reconnected as required. The cables may either be provided with alternate cable connection points on the unit or the cables may be of sufficient length to reach the load cell 110 or coil unit 150 in the alternate positions.

The scale system with load cell is only one example of a scanner-scale configuration. For example, in an alternative embodiment where the coil unit(s) is/are mounted to the weigh platter, the weighing mechanism would weigh the coil unit(s) along with the weigh platter and any items placed thereon. The weight calibration would then adjust for the additional weight of the coil unit(s) mounted thereon. Of course, the system does not require the scale and weigh platter. For example, scanners such as the Magellan® SL scanner are sold in scanner-scale and scanner-only versions. Thus the platter of any of the embodiments may merely comprise a scanner surface. The scanner may comprise a single plane horizontal scanner (with a horizontal window disposed in the counter surface below a scan volume) with the deactivation unit(s) installed therein, or a single plane vertical scanner (with a vertical window disposed to one side of the scan volume) with the deactivation unit(s) installed therein.

Figure 13:
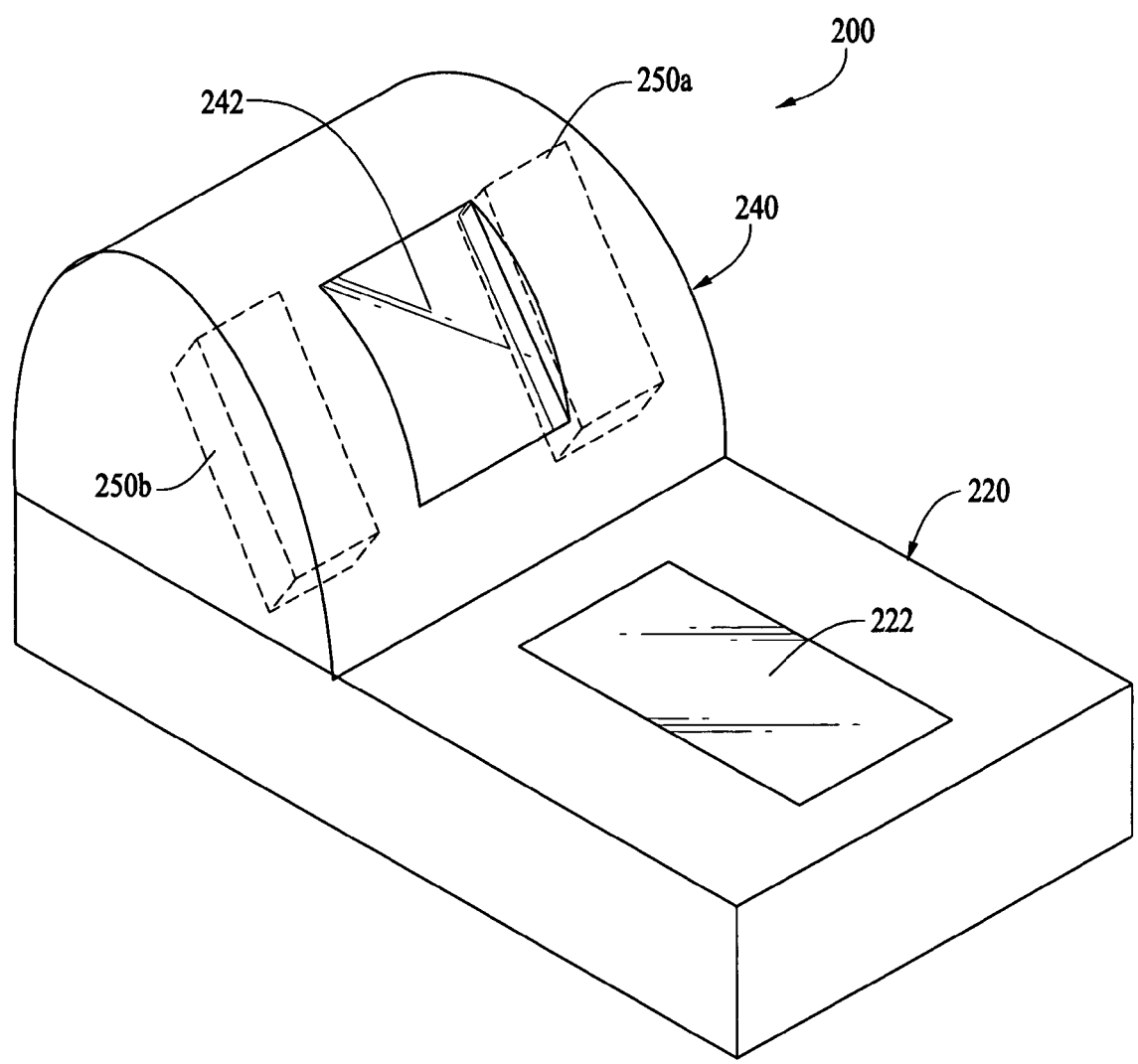
FIG. 13 is perspective view of a combined data reader and EAS system according to an alternate embodiment with deactivation unit(s) disposed in a vertical section of the reader.

FIG. 13 illustrates another embodiment for configuring deactivation coil unit(s) on a multiplane (having both a vertical window 242 and a horizontal window 222) or vertical scanner (having only a vertical window 242, the lower housing section 220 and/or the horizontal window 222 being omitted). The unit 200 specifically illustrated in FIG. 13 is a multiplane scanner such as the Magellan® scanners available from PSC Inc. having an upper housing section 240 containing a vertical window 142 and a lower housing section 220 containing a horizontal window 222. The windows 242 and 222 are disposed in an L-shape and form a scan volume therebetween. Alternately, the unit may be a vertical scanner only with the horizontal window 222 omitted (with or without a weigh platter, or with or without a horizontal section). According to a first embodiment, a coil unit 250a is placed in the upper housing section 240 behind the window 242 on the right side of the section 240. Preferably in a left-to-right scanning configuration, the coil unit 250a is disposed generally downstream of the scan volume, serving to deactivating an item's EAS tag after the item's optical code has been read by the scanner.

In a second embodiment, a coil unit 250b is placed in the upper housing section 240 behind the window 242 on the left (lateral) side of the section 240. Preferable for a right-to-left scanning configuration, the coil unit 250b is disposed generally downstream of the scan volume, serving to deactivating an item's EAS tag after the item's optical code has been read by the scanner.

In a third embodiment, the system 200 is provided with two coil units 250a, 250b. In one configuration, the upstream coil unit is operative to sense presence of an EAS tag and the downstream coil unit is operative to deactivate an EAS tag. Alternately, both coil units (upstream and downstream) may be operative to deactivate EAS tags according to a suitable operations protocol.

The coil units 250a, 250b are preferably of the same configuration and interchangeable. Thus a single coil unit 250a disposed on the right side may be readily removed and reinstalled on the left side thus converting the unit 200 from a left-to-right configuration to a right-to-left configuration or a single coil unit 250b disposed on the left side may be readily removed and reinstalled on the right side thus converting the unit 200 from a right-to-left configuration to a left-to-right configuration.

The enclosure of the units 250a, 250b may be integrated within the upper housing section 240 or may be removably connected on the outer surface of the enclosure. The housing section 240 may be formed with detents or connectors for accommodating physical mounting and electrical connection of the coil unit 250. Preferably the coils units 250a, 250b are preferably of the same configuration and interchangeable. Thus a single coil unit 250a disposed on the right side may be readily removed and reinstalled on the left side thus converting the unit 200 from a left-to-right configuration to a right-to-left configuration or a single coil unit 250b disposed on the left side may be readily removed and reinstalled on the right side thus converting the unit 200 from a right-to-left configuration to a left-to-right configuration.

Figure 14:
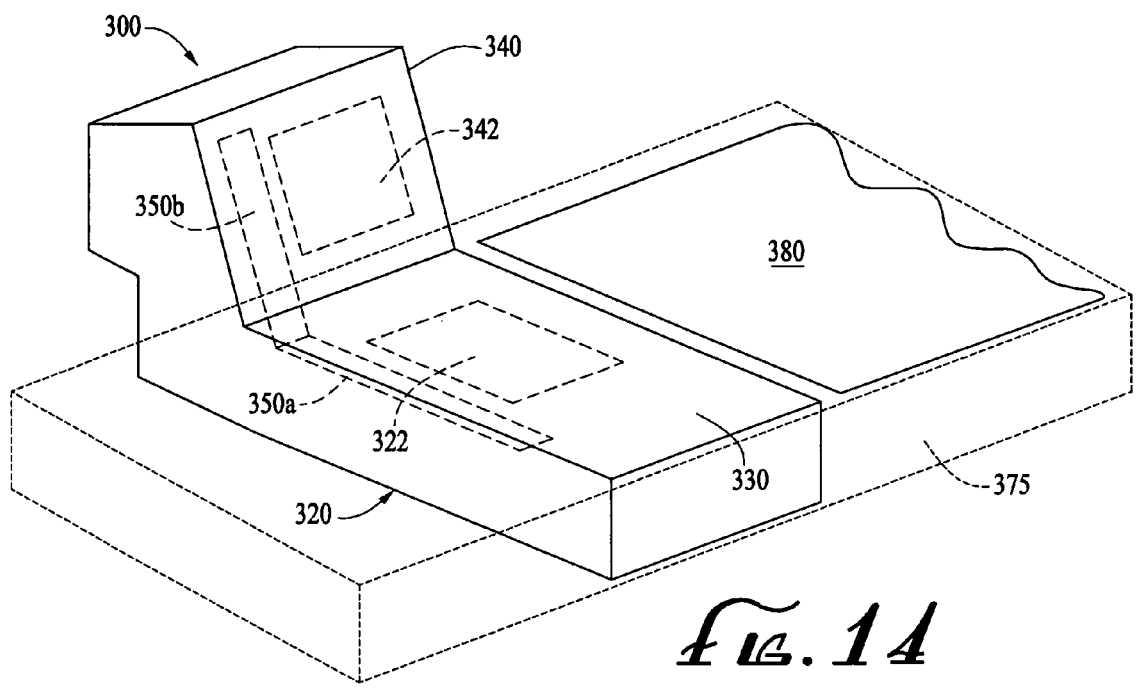
FIG. 14 is perspective view of a combined data reader and EAS system according to an alternate embodiment, the data reader installed in a checkout counter and having multi-dimensional deactivation unit(s).
Figure 15:
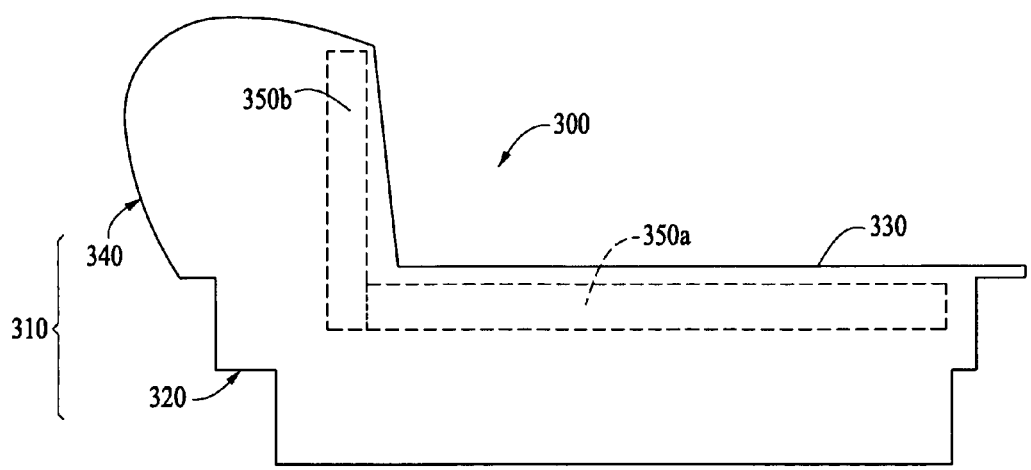
FIG. 15 is a left side plan view of FIG. 14.

FIGS. 14-15 illustrate yet another configuration for a reader/EAS deactivation unit 300 providing multiplane deactivation. The unit 300 comprises either a vertical scanner (no horizontal window), or a multiplane scanner (vertical and horizontal windows 342, 322) with housing sections and windows arranged in a generally L-shape. The scanner housing 310 has (a) an upper housing section 340, (b) a lower housing section 320, and (c) an EAS deactivation unit comprised of two parts: (1) a lower unit 350a disposed in the cavity within the lower housing section 320 below the weigh platter 330, and to one side of the horizontal window 322 and (2) an upper unit 350b arranged vertically next to the vertical window 342 in upper housing section 340. As in the previous embodiment, the system 300 may be configured with a single deactivation unit on one side of the windows 322, 342 or with two deactivation units, one on either side of the windows 322, 342.

According to a first embodiment, the lower deactivation unit 350a is placed on the left side of the lower housing section 320. Preferably in a right-to-left scanning configuration, the deactivation unit 350a is disposed generally downstream of the scan volume, serving to deactivating an item's EAS tag after the item's optical code has been read by the scanner. In order to provide better coverage for EAS tag deactivation, a second deactivation unit 350b is disposed in the upper housing section 340, also to the left side of the vertical window 342 and generally perpendicular to the first deactivation unit 350b. The deactivation units 350a and 350b thus form a generally L-shape creating a deactivation field better corresponding to the scan field. The angle at or off of 90° may be selected by the designer for the particular scanner configuration. The units 350a and 350 be may be separate units, or they may be physically and/or electrically connected.

The system 300 is illustrated in FIG. 14 installed in a checkout counter. A retail checkstand, applicable to both the system 300 of FIGS. 14-15 as well as the other embodiments described herein, would typically include a cash register with display screen, a keypad, and a checkout counter. The system 300 in FIG. 14 is illustrated installed within a checkout counter 375, the counter surface including a conveyor 380 on the upstream side for transporting items to the housing 320 for a right-to-left scanning operation. The scanner housing 310 is preferably installed in the checkout counter such that the Window 322 and platter 330 are flush with the top surface of the counter 375.

In a preferred configuration, one of the units (for example lower unit 350a) comprises a coil unit having a central core of magnetically-active material (e.g. iron) with an outer wire winding through which current is passed to create the deactivating magnetic field. The second unit (in this example upper unit 350b) may comprise another coil unit, but may alternately comprise merely a core of magnetically active material, that is, a bare core unit without windings. The bare core unit 350b acts in concert the coil unit 350a to steer the magnetic field produced by the coil unit 350a into the scan volume. Alternately, the coil unit may be disposed in the upper housing section and the bare core unit disposed in the lower housing section.

In configurations similar to alternatives described for previous embodiments, the units 350a, 350b may be placed on either the left side which is preferable for a right-to-left scanning configuration, or on the right side which is preferable for left-to-right scanning, as it is believed to be preferable to locate the deactivation units generally downstream of the scan volume, serving to deactivating an item's EAS tag after the item's optical code has been read by the scanner. Alternately, the system 300 may be provided with unit pairs on both left and right sides. In one configuration, the upstream unit pair is operative to sense presence of an EAS tag and the downstream unit pair is operative to deactivate an EAS tag. Alternately, both unit pairs (upstream and downstream) may be operative to deactivate EAS tags according to a suitable operations protocol.

The upper unit 350b may be integrated within the upper housing section 340 (e.g. formed into the enclosure itself) or may be constructed to be mounted to the inside surface, or to the outside front or lateral surface of the enclosure. The upper housing section 340 may be formed with detents or connectors for accommodating physical mounting and electrical connection of the coil unit 350. Preferably the coil units are of the same configuration and interchangeable such that a single coil unit disposed on the right side may be readily removed and reinstalled on the left side and vice versa. Similarly, core units should be interchangeable as between the left and right sides.

Figure 16:
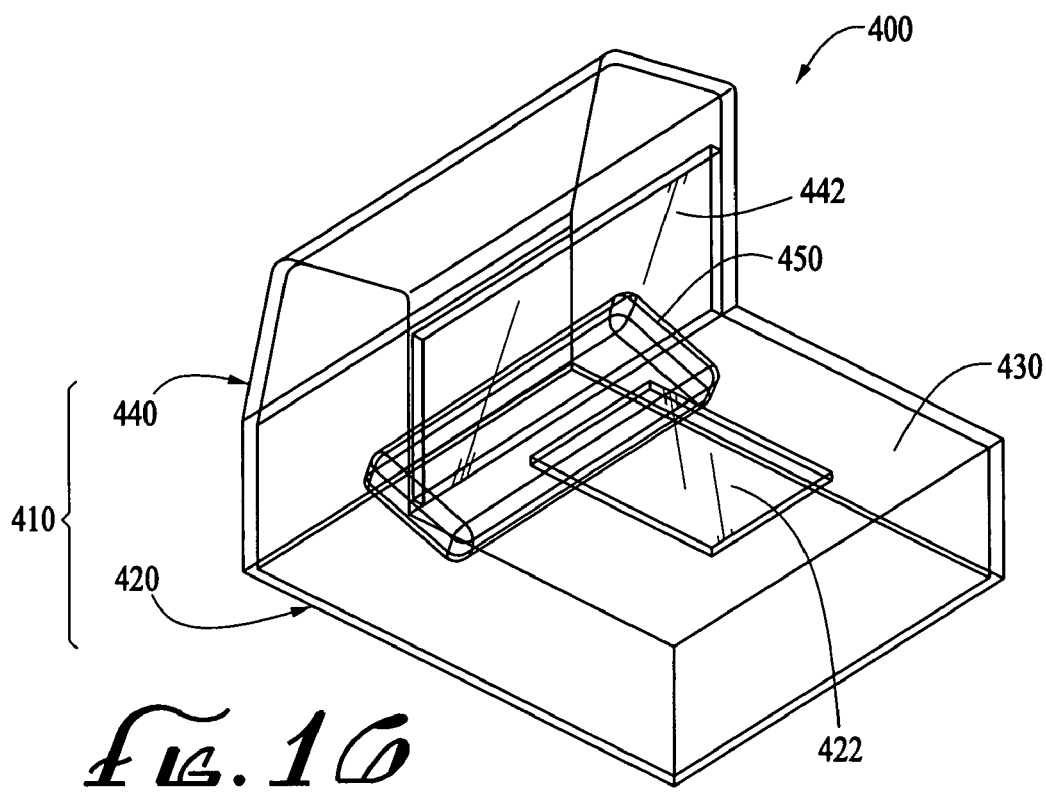
FIG. 16 is perspective view of a combined data reader and EAS system according to an alternate embodiment with a deactivation unit disposed longitudinally between the horizontal and vertical sections of the reader.
Figure 17:
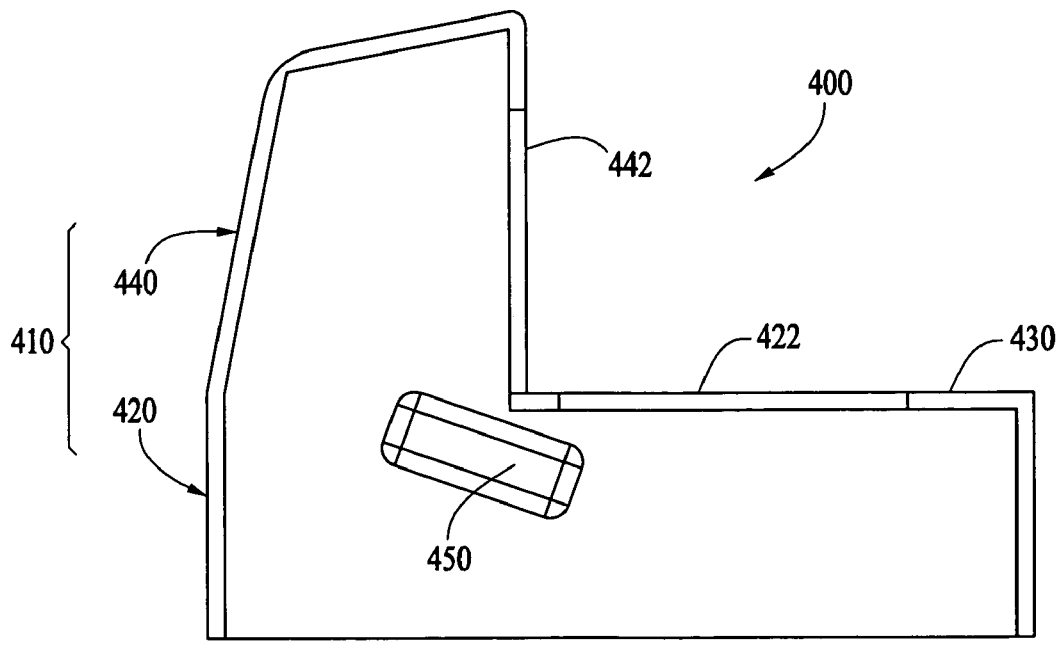
FIG. 17 is a left side plan view of FIG. 16.

FIGS. 16-17 illustrate another configuration for a combined EAS and bar code reader 400. The data reader 410 is illustrated as an L-shaped scanner with a lower section 420 containing a horizontal scan window 422 disposed in the horizontal surface or weigh platter 430, and an upper section 440 containing a vertical scan window 442.

The deactivation unit 450 is disposed longitudinally along the direction of product movement and generally at the intersection between the lower section 420 and the upper section 440. The deactivation unit 450 is oriented longitudinally such that its long axis is arranged parallel to the scan direction that items are swept through the scan volume. This configuration may provide for a single configuration working equally well for right-to-left or left-to-right sweep directions. The deactivation field generated may more closely match the scan volume, particularly for leading and trailing edges. The length of the unit 450 may be further extended to extend the deactivation zone enabling items to remain in the deactivation zone for a longer period of time as the item is swept through the scan volume. Such an extended deactivation zone may also more closely match the scan volume for leading and trailing side labels. This position for the deactivation unit 450 may also simplify scale integration.

Figure 18:
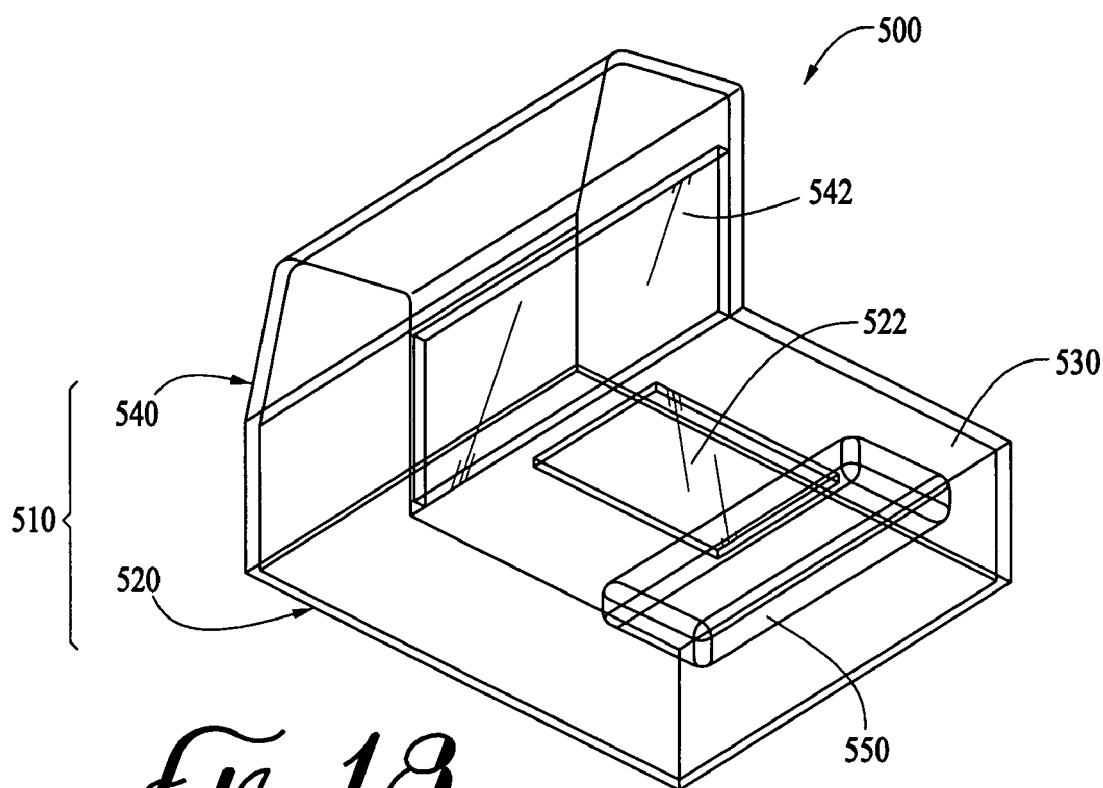
FIG. 18 is perspective view of a combined data reader and EAS system according to an alternate embodiment with a deactivation unit disposed longitudinally at the proximal end of the horizontal section distal from the vertical section.
Figure 19:
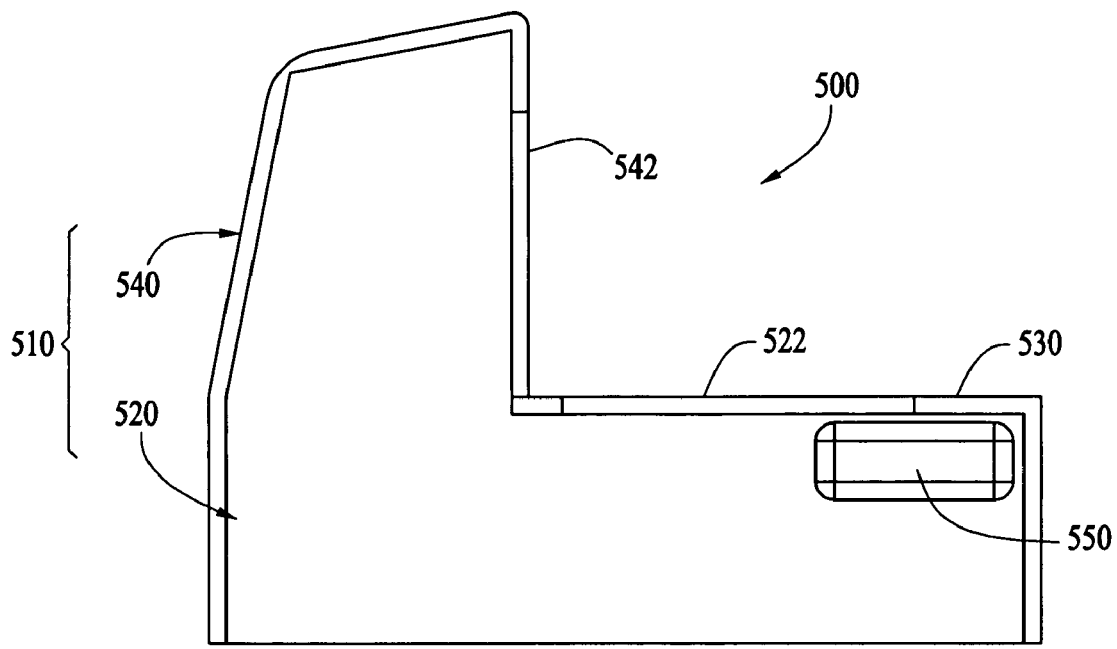
FIG. 19 is a left side plan view of FIG. 18.

FIGS. 18-19 illustrate another configuration for a combined EAS and bar code reader 500. The data reader 510 is illustrated as an L-shaped scanner with a lower section 520 containing a horizontal scan window 522 disposed in the horizontal surface or weigh platter 530, and an upper section 540 containing a vertical scan window 542.

The deactivation unit 550 is disposed longitudinally along the scan direction of item sweep and in the lower housing section 520 distal from the upper housing section 540 and next to the operator (also know as "checker side"). The long axis of the deactivation unit 550 is arranged parallel to the direction through items are swept through the scan volume. This configuration may also provide for a single configuration working equally well for right-to-left or left-to-right sweep directions. The deactivation field generated may more closely match the scan volume, particularly for leading and trailing edges. The length of the unit 550 may be further extended to extend the deactivation zone enabling items to remain in the deactivation zone for a longer period of time as the item is swept through the scan volume. Such an extended deactivation zone may also more closely match the scan volume for leading and trailing side labels. This position for the deactivation unit 550 may also simplify scale integration.

Figure 20:
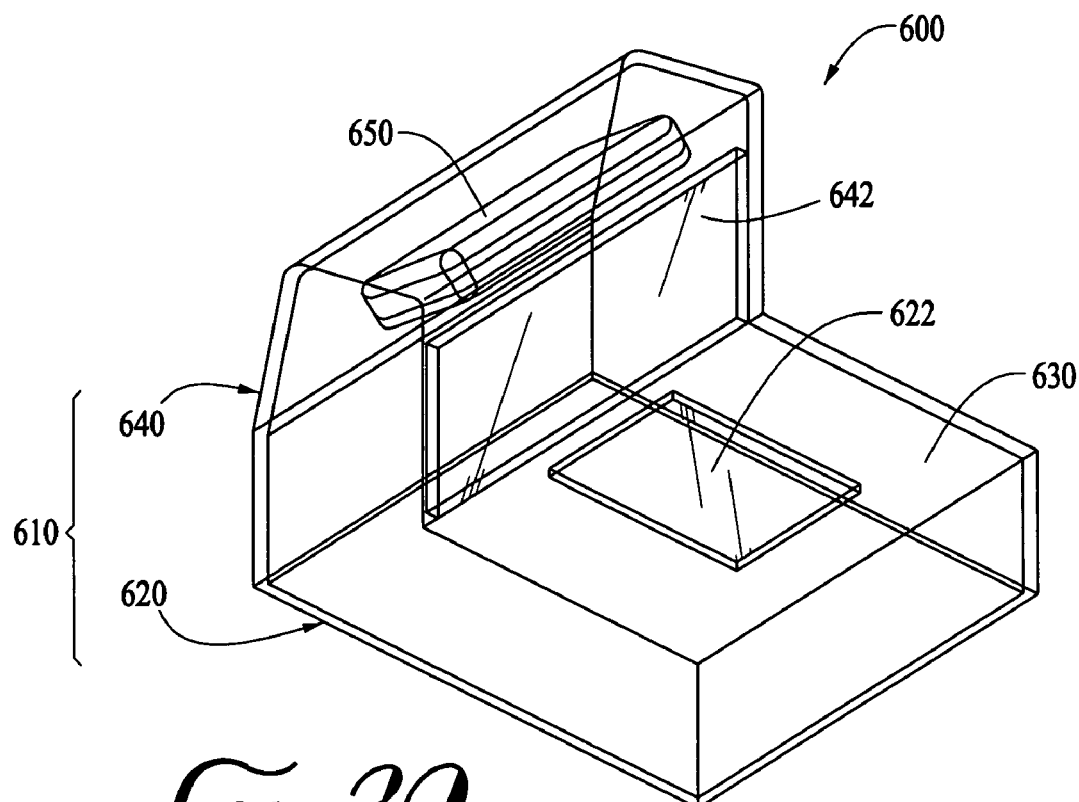
FIG. 20 is perspective view of a combined data reader and EAS system according to an alternate embodiment with a deactivation unit disposed longitudinally at the upper end of the vertical section distal from the horizontal section.
Figure 21:
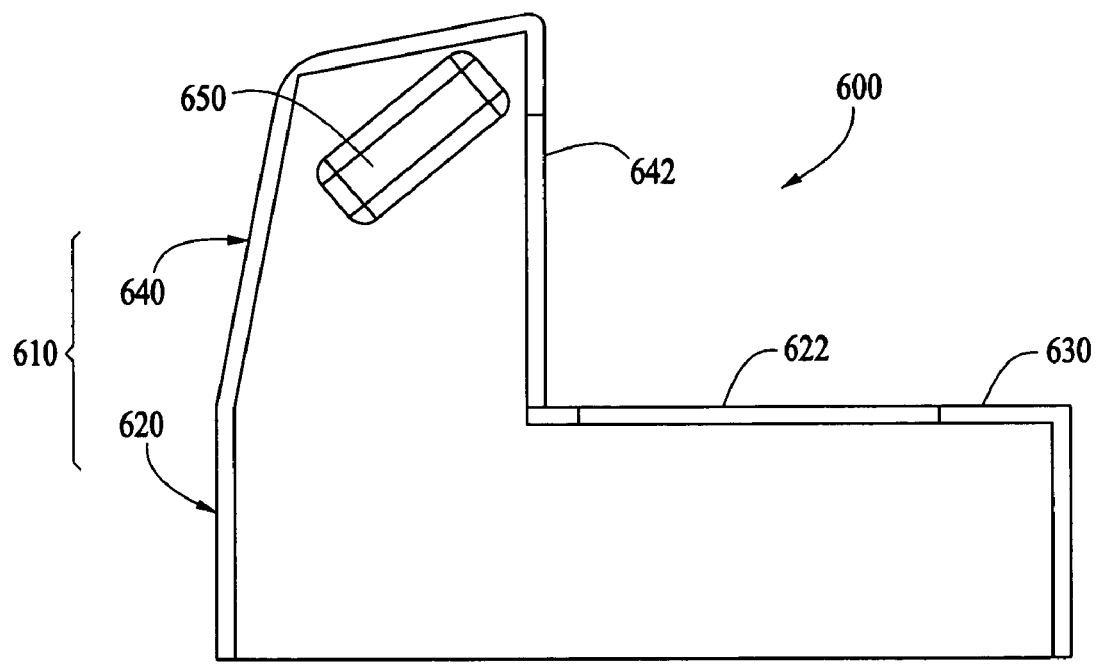
FIG. 21 is a left side plan view of FIG. 20.

FIGS. 20-21 illustrate yet another configuration for a combined EAS and bar code reader 600. The data reader 610 is illustrated as an L-shaped scanner with a lower section 620 containing a horizontal scan window 622 disposed in the horizontal surface or weigh platter 630, and an upper section 640 containing a vertical scan window 642.

The deactivation unit 650 is disposed longitudinally along the direction of product movement and in a top portion of the upper section or bonnet 640 distal from the lower section 620. The long axis of the deactivation unit 650 is arranged parallel to the sweep direction in which items are passed through the scan volume. This configuration may also provide for a single configuration working equally well for right-to-left or left-to-right sweep directions. The deactivation field generated may more closely match the scan volume, particularly for leading and trailing edges. The length of the unit 650 may be further extended to extend the deactivation zone enabling items to remain in the deactivation zone for a longer period of time as the item is swept through the scan volume. Such an extended deactivation zone may also more closely match the scan volume for leading and trailing side labels. In this upper location, the deactivation unit 650 is separated from the metal casting and weigh platter 630 so that magnetic field strength may be enhanced. Scale integration may also be simplified.

Figure 22:
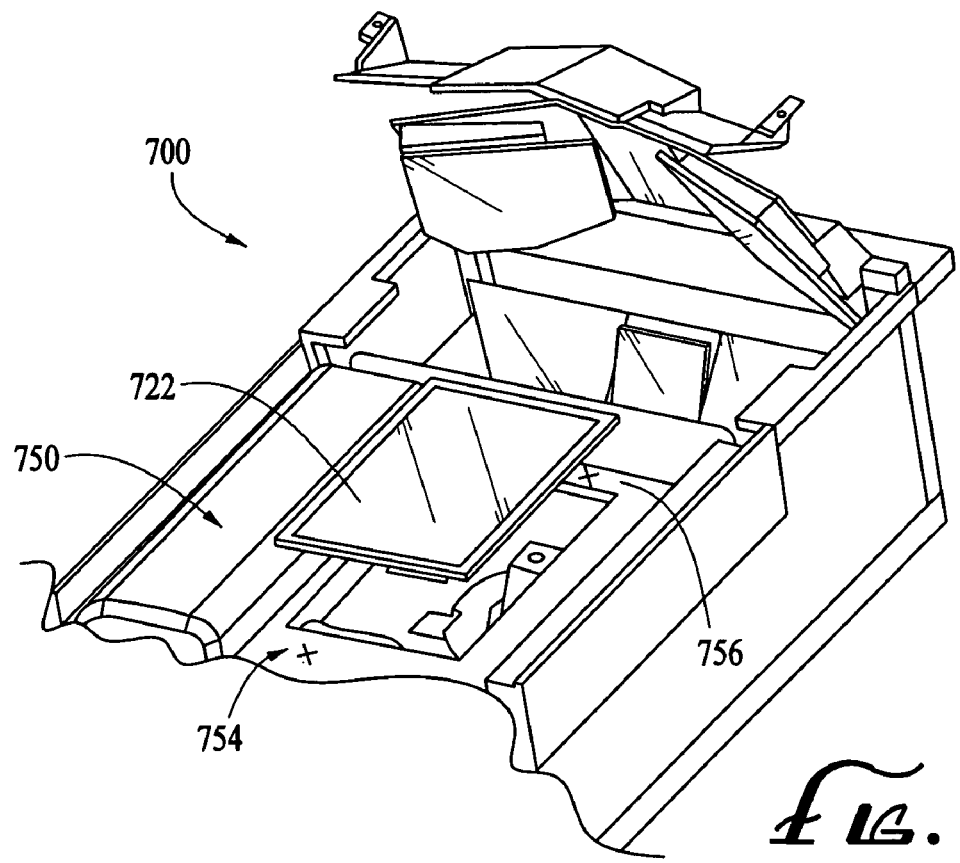
FIGS. 22-23 illustrate a combined EAS and bar code reader with scale system having two load cells.
Figure 23:
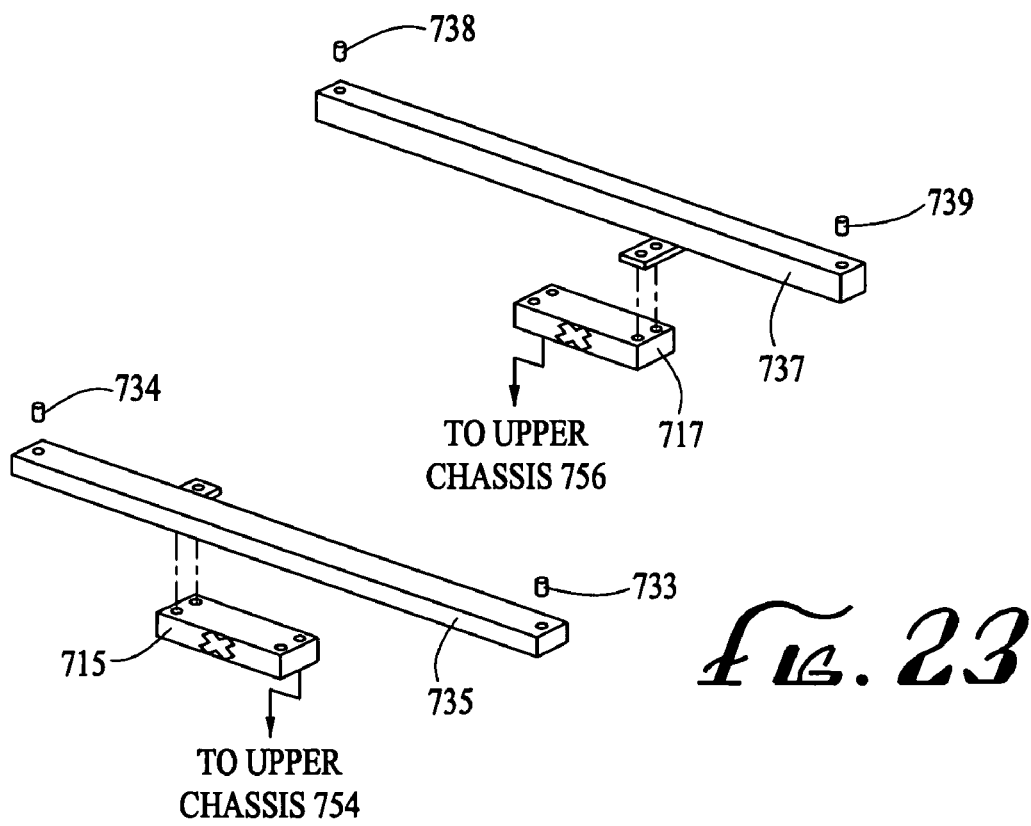

With respect to scale integration, the above embodiments of FIGS. 1-12 illustrate a single load cell design. FIGS. 22-23 illustrate a combined EAS and bar code reader with scale system 700 having two load cells 715, 717. The weigh platter (shown removed) which contains the horizontal window 722) rests on a front spider or bar 735 and a rear spider or bar 737. The front spider 735 is supported by the first load cell 715. Platter levelers 733, 734 are placed between the load cell 715 and the spider 735 for providing leveling adjustment of the weigh platter. Similarly, rear spider 737 is supported by the second load cell 717. Platter levelers 738, 739 are placed between the load cell 717 and the spider 737 for providing leveling adjustment of the weigh platter.

Figure 24:
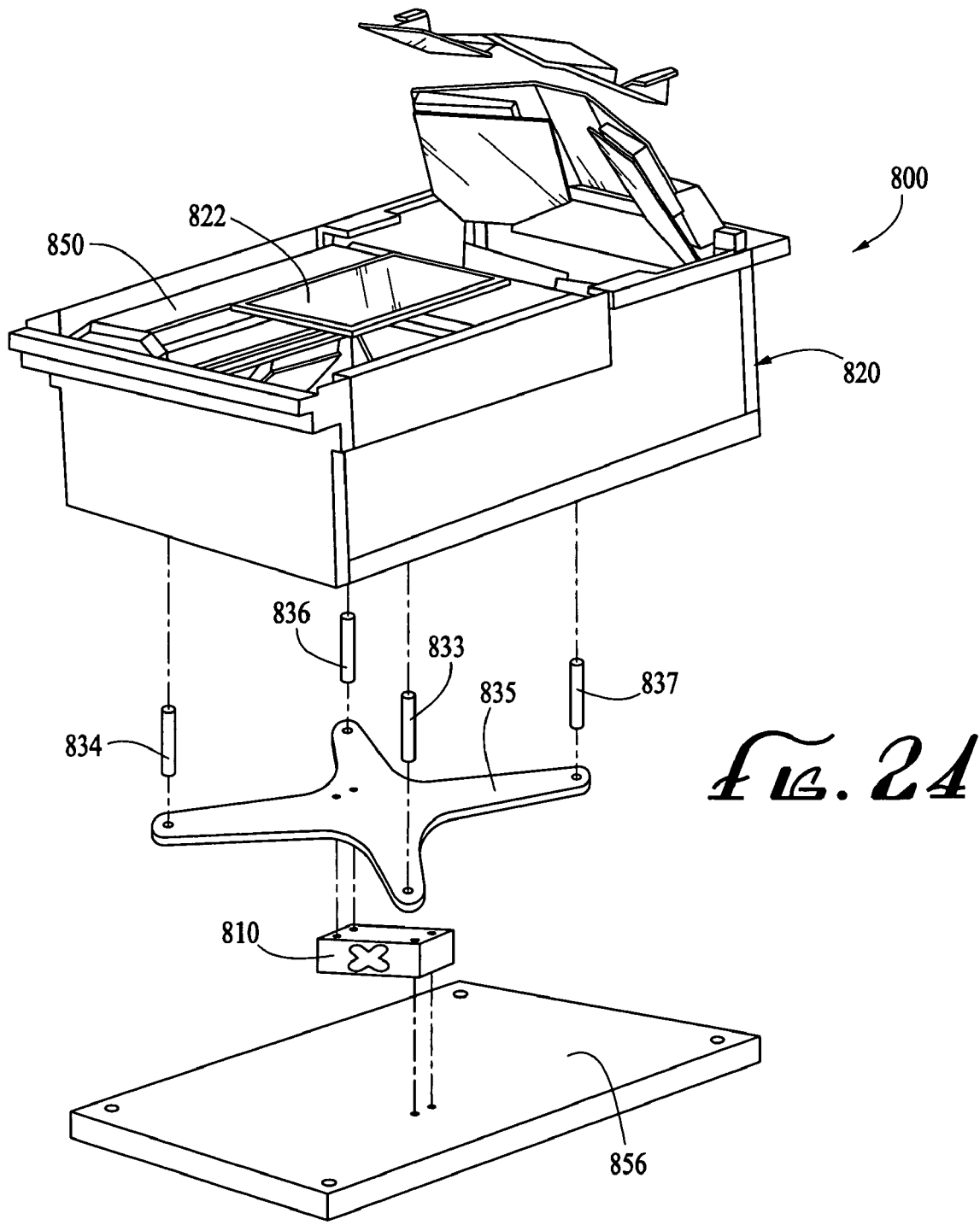
FIG. 24 illustrates another combined EAS and bar code reader with scale system having one load cell.

FIG. 24 illustrates yet another combined EAS and bar code reader with scale system 800 having a single load cell 810. The weigh platter (shown removed) which contains the horizontal window 822) rests on load posts 833, 834, 836, 837 which extend to the bottom of the lower housing section 820 connecting onto spider 835. The spider 835 is in turn mounted onto the load cell 810. The load cell 810 is mounted onto a base 856 or chassis such as the bottom of the housing section 820.

By separating the load cell 810 and spider 835, additional space is provided for the deactivation coil 850 (or multiple coils as in previous embodiments) simplifying construction. The additional space also simplifies interchangeable configurations such as where the deactivation unit 850 disposed on the left lateral side of the window 822 needs to be switched to the right lateral side.

In a preferred configuration, the core unit comprises a block of magnetically active material having a generally rectangular cross-section. In one configuration, the core is about 3 in (7.6 cm) wide, 1.5 in (3.8 cm) deep and 9 in (22.9 cm) long. The unit is preferably elongated, having a length at least about three times its width. Alternately, the core may have a circular or oval cross-section of about 1.5 in (3.8 cm) in diameter. The housing for the core unit may be made of a variety of materials but is preferably injection molded from a non-magnetically active material such as polystyrene or polycarbonate.

The systems disclosed may alternately comprise not only EAS deactivation units, but also activation units or combined activation/deactivation units usable with activatable EAS tags. In addition, the EAS tag deactivators/activators described may include deactivation or activation of various types of EAS tags such as magnetoacoustic, magnetomechanical, magnetostrictive, RF (e.g. RFID), microwave, and harmonic type tags. A preferred configuration for the EAS deactivation coil unit comprises (a) a central core of magnetically active material and (b) outer winding(s) disposed around the central core. Moreover, in each of the above embodiments, the deactivation units may comprise coil units with or without internal (magnetically active) core. For example, deactivation coils without internal core are described in U.S. Pat. No. 5,917,412 incorporated by reference.

The deactivation units of the above embodiments may be controlled and operated by any suitable scheme as known by one skilled in the art, including but not limited to those schemes disclosed in U.S. Pat. Nos. 5,917,412; 6,281,796; 6,169,483; and 5,059,951 hereby incorporated by reference in their entirety. For example as disclosed in U.S. Pat. No. 6,281,796, in operation, an article can be moved past the data reader and once the data reader successfully reads the indicia, a signal is sent to the EAS tag deactivator which then deactivates EAS tag. The EAS tag deactivator will remain energized for a preselected period of time. The time period of energization for EAS tag deactivator will be selected to allow sufficient time for an operator to move article from the data reader to the EAS tag deactivator for deactivation of EAS tag. EAS tag deactivator will turn off after the preselected period of time has expired to reduce power consumption and use, and to prevent deactivation of EAS tags when no indicia has been read by the data reader.

The combined data reader and EAS system may comprise a POS interface unit, that includes POS indicator sensor, signal conditioning for the sensor output signal of indicator sensor, and trigger generation, which generates a trigger signal in response to the sensor output signal. Signal conditioning, as fully described in U.S. Pat. No. 6,281,796, selectively recognizes the expected sensor output signal of indicator sensor, and translates signal to trigger generator 16 for generation of trigger signal. The EAS tag deactivator is energized by the trigger signal received from POS interface unit. The indicator sensor may sense the output of data reader indicator non-invasively. The connection of sensor output signal of indicator sensor to POS interface unit can include, but is not limited to, cable, acoustic link, IR link, RF link, optical link, and other wire or wireless links.

In the various embodiments described above, the data reader unit has been generally described as a two window L-shaped bar code scanner, but other types of data readers may be combined with the EAS deactivation/activation system. The data reader may be for example a laser bar code scanner, an imaging reader, or other type of reader for reading optical codes, reading tags, or otherwise identifying items being passed through a scan/read zone.

Thus the present invention has been set forth in the form of its preferred embodiments. It is nevertheless intended that modifications to the disclosed scanning systems may be made by those skilled in the art without altering the essential inventive concepts set forth herein.

It will be obvious to those having skill in the art that many changes may be made to the details of the above-described embodiments without departing from the underlying principles of the invention. The scope of the present invention should, therefore, be determined only by the following claims.

The invention claimed is:

1. A checkout device comprising:
   a scale assembly including a base portion and a weigh plate over the base portion, wherein the weigh plate includes an aperture;
   a barcode reader between the base portion and the weigh plate which reads a barcode through the aperture in the weigh plate;
   a security label deactivation system; and
   a controller that enables the security label deactivation system only after successful reading of the barcode,
   wherein the security label deactivation system comprises a magnetic coil unit disposed between the weigh plate and the base portion, the magnetic coil unit including outer windings disposed around a central core.

2. A system for data reading and electronic article surveillance (EAS) tag deactivation, comprising:
   a housing including a window oriented generally horizontally;
   a data reader disposed in the housing to read an item through the window as the item is passed through a scan volume defined above the window;
   an EAS deactivation unit disposed in the housing and to a lateral side of the window; and
   a controller that enables the EAS deactivation unit only after successful reading of the item,
   wherein the EAS deactivation unit comprises a magnetic coil unit disposed below a plane of the window, the magnetic coil unit including outer windings disposed around a central core.

3. The system of claim 2 wherein the system is an integrated system for bar code reading and EAS tag deactivation wherein the data reader comprises a bar code reader for reading a barcode label on the item.

4. The system of claim 3 wherein the item is passed through the scan volume in a direction of item movement from a position upstream of the bar code reader to a position downstream of the bar code reader and wherein said one lateral side of the window is downstream of the window.

5. The system of claim 4 wherein the controller for the EAS deactivation unit is enabled upon receipt of a good read signal from the bar code reader, and wherein the EAS deactivation unit is part of an EAS system which operates to detect an EAS tag only if the barcode reader has successfully read the barcode label.

6. The system of claim 5 wherein the EAS system comprises an electromagnetic coil packaged in a generally rectangular shape package in which the lengthwise dimension of the electromagnetic coil is oriented substantially perpendicular to the direction of item movement.

7. The system of claim 6 wherein the electromagnetic coil comprises separate sense and deactivation coils.

8. The system of claim 3 wherein the integrated system further comprises a weigh scale.

9. The system of claim 2 further comprising: a weigh plate, the window being disposed in the weigh plate; wherein the EAS deactivation unit is disposed between the weigh plate and the housing.

10. The system of claim 2 further comprising: a load cell mounted in the housing the load cell supporting the weigh plate.

11. A checkout system for data reading and electronic article surveillance (EAS) tag deactivation, comprising:
    a scanner including a scanner housing which fits within a check stand hole and having a window facing a scan volume through which items are passed;
    an EAS deactivation unit disposed in the scanner housing laterally to one side of the window and downstream of the scan volume; and
    a controller that enables the EAS deactivation unit only upon a successful scan of an item passed through the scan volume,
    wherein the EAS deactivation unit comprises a magnetic coil unit disposed below a plane of the window, the magnetic coil unit including outer windings disposed around a central core.

12. The system of claim 11 wherein the window of the scanner is oriented horizontally.

13. A checkout system for data reading and electronic article surveillance (EAS) tag deactivation comprising:
    a housing including a window facing a scan volume;
    a data reader disposed in the housing to read an item through the window as the item is passed through the scan volume;
    an EAS deactivation unit disposed in the housing adjacent to and downstream of the window; and
    a controller that enables the EAS deactivation unit only upon a successful read of an item passed through the scan volume,
    wherein the EAS deactivation unit comprises a magnetic coil unit disposed below a plane of the window, the magnetic coil unit including outer windings disposed around a central core.

14. The system of claim 13 further comprising: a weigh plate; and a load cell.

15. A checkout device comprising:
    a barcode reader including a first portion having a substantially horizontal aperture and a second portion having a substantially vertical aperture;
    a weigh platter suspended above the first portion; and
    a security label deactivation system between the first portion and the weigh platter, wherein the security label deactivation system comprises a magnetic coil unit including a central portion and outer windings disposed about the central portion, the magnetic coil unit generating a magnetic field for deactivating electronic security tags.

16. A checkout device comprising:
    a barcode reader including a first portion having a substantially horizontal aperture and a second portion having a substantially vertical aperture;
    a weigh platter suspended above the first portion; and
    a security label deactivation system adjacent the first portion and under the weigh platter, wherein the security label deactivation system comprises a magnetic coil unit including a central portion and outer windings disposed about the central portion, the magnetic coil unit generating a magnetic field for deactivating electronic security tags.

17. A checkout device comprising:
a first barcode scanning portion for generating first scan lines that pass through a substantially horizontal aperture;
a second barcode scanning portion for generating second scan lines that pass through a substantially vertical aperture;
a weigh platter suspended above the first barcode scanning portion; and
a security label deactivation system between the first barcode scanning portion and the weigh platter, wherein the security label deactivation system comprises a magnetic coil unit including a central portion and outer windings disposed about the central portion, the magnetic coil unit generating a magnetic field for deactivating electronic security tags.

18. A checkout device comprising:
a barcode reader including a first portion having a substantially horizontal aperture and a second portion having a substantially vertical aperture;
a weigh platter suspended above the first portion; and
a security label deactivation system between the first portion and the weigh platter substantially to one side of the substantially horizontal aperture, wherein the security label deactivation system comprises a magnetic coil unit including a central portion and outer windings disposed about the central portion, the magnetic coil unit generating a magnetic field for deactivating electronic security tags.

19. The checkout device as recited in claim 18, wherein the one side comprises a left side.

20. The checkout device as recited in claim 18, wherein the one side comprises a right side.

* * * * *